United States Patent
Jani et al.

(10) Patent No.: US 11,122,815 B2
(45) Date of Patent: Sep. 21, 2021

(54) SYSTEM AND METHOD FOR FORMING AND COOLING CHEWING GUM

(75) Inventors: Bharat Jani, East Brunswick, NJ (US); Leonard Scarola, Cary, NC (US); Miles Van Niekerk, Madison, NJ (US); Krishna Adivi, Summit, NJ (US); Jesse Kiefer, Oxford, NJ (US); Hendrik Eyselee, Glencoe, IL (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 822 days.

(21) Appl. No.: 14/233,829

(22) PCT Filed: Jul. 19, 2012

(86) PCT No.: PCT/US2012/047411
§ 371 (c)(1),
(2), (4) Date: Jun. 6, 2014

(87) PCT Pub. No.: WO2013/013046
PCT Pub. Date: Jan. 24, 2013

(65) Prior Publication Data
US 2014/0287091 A1    Sep. 25, 2014

Related U.S. Application Data (60) Provisional application No. 61/510,123, filed on Jul. 21, 2011.

(51) Int. Cl.
*A23G 4/04*    (2006.01)
*A23G 4/18*    (2006.01)
(Continued)

(52) U.S. Cl.
CPC ............. *A23G 4/04* (2013.01); *A23G 3/0019* (2013.01); *A23G 3/0236* (2013.01); *A23G 4/18* (2013.01); *A23G 7/0093* (2013.01); *A23G 7/02* (2013.01)

(58) Field of Classification Search
CPC .......... A23G 4/04; A23G 4/18; A23G 3/0236; A23G 3/0019; A23G 7/02; A23G 7/0093
See application file for complete search history.

(56) References Cited

U.S. PATENT DOCUMENTS

| | | |
|---|---|---|
| 168,443 A | 10/1875 | Arend |
| 571,921 A | 11/1896 | Harton |

(Continued)

FOREIGN PATENT DOCUMENTS

| | | |
|---|---|---|
| CA | 1253735 | 5/1989 |
| CA | 2721516 | 12/2009 |

(Continued)

OTHER PUBLICATIONS

JP OA 2012-549982 dated Mar. 4, 2014 with English Translation.
(Continued)

*Primary Examiner* — Nikki H. Dees
(74) *Attorney, Agent, or Firm* — Cantor Colburn LLP (57) ABSTRACT

Disclosed is a system for forming and cooling gum, the system including a forming system configured to size the gum to include a substantially uniform thickness, a cooling device that is disposed in-line with the forming system and configured to continuously receive the gum from the forming system at an entry point of the cooling device, and a multi-pass conveying system configured to continuously transport the gum from the entry point to an exit point of the cooling device, the forming system and the cooling device (Continued)

being configured to form and cool the gum to be in a condition for stacking or collecting upon exiting the exit point of the cooling device.

25 Claims, 5 Drawing Sheets

(51) Int. Cl.
*A23G 3/02* (2006.01)
*A23G 3/34* (2006.01)
*A23G 7/02* (2006.01)
*A23G 7/00* (2006.01)

(56) References Cited

U.S. PATENT DOCUMENTS

| | | |
|---|---|---|
| 1,357,665 A | 11/1920 | Watkins |
| 1,629,461 A | 5/1927 | Berg |
| 1,684,436 A | 9/1928 | Dellenbarger |
| 1,771,506 A | 7/1930 | Mustin |
| 1,829,029 A | 10/1931 | Zimmerli et al. |
| 1,871,346 A | 8/1932 | Savy |
| 1,879,897 A | 9/1932 | Gernelle-Danloy |
| 2,156,810 A | 5/1939 | Garbutt |
| 2,227,728 A | 1/1941 | Lombi |
| 2,496,548 A | 2/1950 | La Rosa et al. |
| 2,507,477 A | 5/1950 | MacDonald et al. |
| 2,558,899 A | 7/1951 | Green |
| 2,604,056 A | 7/1952 | Mahle |
| 2,771,637 A | 11/1956 | Silvasy et al. |
| 2,941,655 A | 6/1960 | Wells |
| 3,215,407 A | 11/1965 | Dye |
| 3,215,536 A | 11/1965 | Simeone et al. |
| 3,301,454 A * | 1/1967 | Wayne ................. A23G 7/0018 225/2 |
| 3,366,992 A | 2/1968 | Seanor et al. |
| 3,384,498 A | 5/1968 | Ahrabi |
| 3,455,755 A | 7/1969 | Phillips |
| 3,464,609 A * | 9/1969 | Murphy ................ A23G 7/0018 225/96.5 |
| 3,492,131 A | 1/1970 | Schlatter |
| 3,570,417 A | 3/1971 | Herrmann |
| 3,585,923 A | 6/1971 | Waller |
| 3,632,358 A | 1/1972 | Echeandia et al. |
| 3,644,169 A | 2/1972 | Phillips |
| 3,652,377 A | 3/1972 | Helmick |
| 3,765,918 A | 10/1973 | Jordan et al. |
| 3,779,034 A | 12/1973 | Morgan |
| 3,779,410 A | 12/1973 | Phillips et al. |
| 3,806,290 A | 4/1974 | Graff et al. |
| 3,857,963 A | 12/1974 | Graff et al. |
| 3,866,571 A | 2/1975 | Austin et al. |
| 3,871,328 A | 3/1975 | English |
| 3,881,708 A | 5/1975 | Carle |
| 3,908,032 A | 9/1975 | Didelot et al. |
| 3,912,817 A | 10/1975 | Sapsowitz |
| 3,962,463 A | 6/1976 | Witzel |
| 3,969,513 A | 7/1976 | Canonne |
| 3,995,064 A | 11/1976 | Ehrgott et al. |
| 4,032,661 A | 6/1977 | Rowsell et al. |
| 4,105,461 A | 8/1978 | Racciato |
| 4,117,645 A | 10/1978 | Phillips |
| 4,124,339 A | 11/1978 | Bernard |
| 4,136,163 A | 1/1979 | Watson et al. |
| 4,178,459 A | 12/1979 | Watson et al. |
| 4,187,320 A | 2/1980 | Koch et al. |
| 4,205,951 A | 6/1980 | Sollich |
| 4,217,368 A | 8/1980 | Witzel et al. |
| 4,229,484 A | 10/1980 | Steels et al. |
| 4,230,688 A | 10/1980 | Rowsell et al. |
| 4,238,510 A | 12/1980 | Cherukuri et al. |
| 4,250,196 A | 2/1981 | Friello |
| 4,266,920 A | 5/1981 | Hayashi et al. |
| 4,274,535 A | 6/1981 | Haas, Sr. et al. |
| 4,279,931 A | 7/1981 | Verwaerde et al. |
| 4,296,255 A | 10/1981 | Roswell et al. |
| 4,299,825 A | 11/1981 | Lee |
| 4,352,824 A | 10/1982 | Puglia et al. |
| 4,352,825 A | 10/1982 | Cherukuri et al. |
| 4,357,355 A | 11/1982 | Koch et al. |
| 4,370,350 A | 1/1983 | Fisher et al. |
| 4,379,169 A | 4/1983 | Reggio et al. |
| 4,382,962 A | 5/1983 | Devos et al. |
| 4,405,647 A | 9/1983 | Fisher et al. |
| 4,428,679 A | 1/1984 | Fischer et al. |
| 4,431,678 A | 2/1984 | Sollich |
| 4,448,736 A | 5/1984 | Emery et al. |
| 4,454,834 A | 6/1984 | Haas, Sr. et al. |
| 4,459,311 A | 7/1984 | Detora et al. |
| 4,459,425 A | 7/1984 | Amano et al. |
| 4,466,983 A | 8/1984 | Cifrese et al. |
| 4,472,437 A | 9/1984 | Corsello et al. |
| 4,486,983 A | 12/1984 | Sunnen et al. |
| 4,490,046 A | 12/1984 | Guibert |
| 4,491,596 A | 1/1985 | Elias |
| 4,497,846 A | 2/1985 | Boursier et al. |
| 4,505,375 A | 3/1985 | Kuster |
| 4,510,271 A | 4/1985 | Muhle et al. |
| 4,519,844 A | 5/1985 | Chaux et al. |
| 4,555,407 A | 11/1985 | Kramer et al. |
| 4,562,076 A | 12/1985 | Arnold et al. |
| 4,579,738 A | 4/1986 | Cherukuri et al. |
| 4,587,125 A | 5/1986 | Cherukuri et al. |
| 4,614,264 A | 9/1986 | Fishburne |
| 4,614,654 A | 9/1986 | Ream et al. |
| 4,619,834 A | 10/1986 | Zanno et al. |
| 4,656,039 A | 4/1987 | Weiss et al. |
| 4,659,014 A | 4/1987 | Soth et al. |
| 4,671,961 A | 6/1987 | Patel et al. |
| 4,692,478 A | 9/1987 | Viswanathan et al. |
| 4,693,888 A | 9/1987 | Miyahara et al. |
| 4,711,784 A | 12/1987 | Yang |
| 4,724,151 A | 2/1988 | Mansukhani et al. |
| 4,728,515 A | 3/1988 | Patel et al. |
| 4,747,881 A | 5/1988 | Shaw et al. |
| 4,753,790 A | 6/1988 | Silva et al. |
| 4,764,020 A | 8/1988 | Moriyama |
| 4,792,495 A | 12/1988 | Taniguchi et al. |
| 4,806,364 A | 2/1989 | Kubota et al. |
| 4,816,265 A | 3/1989 | Cherukuri et al. |
| 4,832,962 A | 5/1989 | Oppenheimer et al. |
| 4,840,491 A | 6/1989 | Hagiwara et al. |
| 4,850,842 A | 7/1989 | Van Alstine |
| 4,876,095 A | 10/1989 | Yang |
| 4,882,172 A | 11/1989 | Van Alstine |
| 4,882,175 A | 11/1989 | Ream et al. |
| 4,900,156 A | 2/1990 | Bauer |
| 4,906,102 A | 3/1990 | Schwarz et al. |
| 4,911,937 A | 3/1990 | Crosello et al. |
| 4,915,958 A | 4/1990 | Fanst et al. |
| 4,929,447 A | 5/1990 | Yang |
| 4,929,508 A | 5/1990 | Sharma et al. |
| 4,933,183 A | 6/1990 | Sharma et al. |
| 4,933,189 A | 6/1990 | Cherukuri |
| 4,933,190 A | 6/1990 | Cherukuri et al. |
| 4,935,242 A | 6/1990 | Sharma et al. |
| 4,938,128 A | 7/1990 | Knebel |
| 4,940,594 A | 7/1990 | Van Alstine |
| 4,971,806 A | 11/1990 | Cherukuri et al. |
| 4,980,177 A | 12/1990 | Cherukuri et al. |
| 4,980,178 A | 12/1990 | Cherukuri et al. |
| 4,981,698 A | 1/1991 | Cherukuri et al. |
| 4,997,659 A | 3/1991 | Yatka et al. |
| 5,009,893 A | 4/1991 | Cherukuri et al. |
| 5,009,916 A | 4/1991 | Colliopoulos |
| 5,045,325 A | 9/1991 | Lesko et al. |
| 5,045,326 A | 9/1991 | Glass et al. |
| 5,085,872 A | 2/1992 | Patel et al. |
| 5,110,607 A | 5/1992 | Yang |
| 5,110,608 A | 5/1992 | Cherukuri et al. |
| 5,125,819 A | 6/1992 | Hager et al. |
| 5,126,151 A | 6/1992 | Bodor et al. |
| 5,128,155 A | 7/1992 | Song et al. |

(56) References Cited

U.S. PATENT DOCUMENTS

| | | | |
|---|---|---|---|
| 5,135,760 | A | 8/1992 | Degady et al. |
| 5,141,128 | A | 8/1992 | Pippin |
| 5,158,725 | A | 10/1992 | Handa et al. |
| 5,164,210 | A | 11/1992 | Campbell et al. |
| 5,170,877 | A | 12/1992 | Francioni |
| 5,171,589 | A | 12/1992 | Richey et al. |
| 5,192,561 | A | 3/1993 | Bunczek et al. |
| 5,192,562 | A | 3/1993 | Grey et al. |
| 5,205,106 | A | 4/1993 | Zimmermann et al. |
| 5,213,724 | A | 5/1993 | Saatkamp |
| 5,217,735 | A | 6/1993 | Zibell |
| 5,223,282 | A | 6/1993 | Patel et al. |
| 5,227,154 | A | 7/1993 | Reynolds |
| 5,229,148 | A | 7/1993 | Copper |
| 5,236,720 | A | 8/1993 | Cherukuri |
| 5,266,592 | A | 11/1993 | Grub et al. |
| 5,283,021 | A | 2/1994 | Shih |
| 5,286,502 | A | 2/1994 | Meyers |
| 5,300,305 | A | 4/1994 | Stapler et al. |
| 5,310,955 | A | 5/1994 | Shirtum et al. |
| 5,324,530 | A | 6/1994 | Kehoe et al. |
| 5,334,397 | A | 8/1994 | Ream et al. |
| 5,344,664 | A | 9/1994 | Fitch et al. |
| 5,366,740 | A | 11/1994 | Shaw et al. |
| 5,378,131 | A | 1/1995 | Greenberg |
| 5,384,144 | A | 1/1995 | Bedard et al. |
| 5,397,580 | A | 3/1995 | Song et al. |
| 5,405,623 | A | 4/1995 | Barkalow et al. |
| 5,409,715 | A | 4/1995 | Meyers |
| 5,419,919 | A | 5/1995 | Song et al. |
| 5,425,962 | A | 6/1995 | Johnson et al. |
| 5,429,827 | A | 7/1995 | Song et al. |
| 5,433,960 | A | 7/1995 | Meyers |
| 5,436,013 | A | 7/1995 | Synosky et al. |
| 5,437,879 | A | 8/1995 | Kabse et al. |
| 5,441,750 | A | 8/1995 | Synosky et al. |
| 5,474,787 | A | 12/1995 | Grey et al. |
| 5,478,593 | A | 12/1995 | Serpelloni et al. |
| 5,486,366 | A | 1/1996 | Song et al. |
| 5,494,685 | A | 2/1996 | Tyrpin et al. |
| 5,520,457 | A | 5/1996 | Gontero et al. |
| 5,523,097 | A | 6/1996 | Song et al. |
| 5,534,281 | A | 7/1996 | Pappas et al. |
| 5,543,160 | A | 8/1996 | Song et al. |
| 5,545,416 | A | 8/1996 | Broderick et al. |
| 5,545,424 | A | 8/1996 | Nakatsu |
| 5,547,689 | A | 8/1996 | Ribadeau-Dumas et al. |
| 5,562,936 | A | 10/1996 | Song et al. |
| 5,567,450 | A | 10/1996 | Zuromski et al. |
| 5,571,543 | A | 11/1996 | Song et al. |
| 5,595,757 | A | 1/1997 | Kiefer et al. |
| 5,601,858 | A | 2/1997 | Mansukhani et al. |
| 5,611,420 | A | 3/1997 | Heim et al. |
| 5,612,071 | A | 3/1997 | Song et al. |
| 5,614,234 | A | 3/1997 | Song et al. |
| 5,629,042 | A | 5/1997 | Serpelloni et al. |
| 5,637,334 | A | 6/1997 | Yatka et al. |
| 5,650,232 | A | 7/1997 | Glenn et al. |
| 5,665,406 | A | 9/1997 | Reed et al. |
| 5,679,389 | A | 10/1997 | Wong et al. |
| 5,679,397 | A | 10/1997 | Kuroda et al. |
| 5,698,181 | A | 12/1997 | Luo |
| 5,733,583 | A | 3/1998 | Muller |
| 5,756,020 | A | 5/1998 | Locke et al. |
| 5,756,133 | A | 5/1998 | Duggan et al. |
| 5,773,053 | A | 6/1998 | Song et al. |
| 5,789,002 | A | 8/1998 | Duggan et al. |
| 5,792,494 | A | 8/1998 | Kanca et al. |
| 5,792,495 | A | 8/1998 | Degady et al. |
| 5,800,847 | A | 9/1998 | Song et al. |
| 5,827,549 | A | 10/1998 | Rancich et al. |
| 5,837,302 | A | 11/1998 | Degady et al. |
| 5,853,243 | A | 12/1998 | Duggan et al. |
| 5,879,728 | A | 3/1999 | Graff et al. |
| 5,908,645 | A | 6/1999 | Townsend et al. |
| 5,915,524 | A | 6/1999 | Horlacher |
| 5,925,387 | A | 7/1999 | Gimmler et al. |
| 5,938,826 | A | 8/1999 | Baker et al. |
| 5,944,266 | A | 8/1999 | Degady et al. |
| 5,955,116 | A | 9/1999 | Kehoe et al. |
| 5,955,123 | A | 9/1999 | Daggy |
| 5,958,472 | A | 9/1999 | Robinson et al. |
| 5,971,739 | A | 10/1999 | Hoffman et al. |
| 5,972,392 | A | 10/1999 | Kopecky et al. |
| 5,976,581 | A | 11/1999 | Song et al. |
| 6,004,589 | A | 12/1999 | Song et al. |
| 6,010,723 | A | 1/2000 | Song et al. |
| 6,017,565 | A | 1/2000 | Rancich et al. |
| 6,017,566 | A | 1/2000 | Bunczek et al. |
| 6,030,647 | A | 2/2000 | Song et al. |
| 6,045,855 | A | 4/2000 | Lindqvist |
| 6,056,429 | A | 5/2000 | Duggan et al. |
| 6,074,135 | A | 6/2000 | Tapphorn et al. |
| 6,080,432 | A | 6/2000 | Tyrpin et al. |
| 6,086,925 | A | 7/2000 | Song et al. |
| 6,103,159 | A | 8/2000 | Schutze et al. |
| 6,159,509 | A | 12/2000 | Johnson et al. |
| 6,168,306 | B1 | 1/2001 | Degady et al. |
| 6,190,706 | B1 | 2/2001 | Bunczek et al. |
| 6,200,608 | B1 | 3/2001 | Gmunder et al. |
| 6,214,389 | B1 | 4/2001 | Hoffman et al. |
| 6,221,421 | B1 | 4/2001 | Wullschleger et al. |
| 6,235,318 | B1 | 5/2001 | Lombardy, Jr. et al. |
| 6,238,710 | B1 | 5/2001 | Song et al. |
| 6,254,373 | B1 | 7/2001 | Hoffman et al. |
| 6,277,385 | B1 | 8/2001 | Luke |
| 6,312,740 | B1 | 11/2001 | Roberts |
| 6,350,480 | B1 | 2/2002 | Urnezis et al. |
| 6,375,448 | B1 | 4/2002 | Duggan et al. |
| 6,436,326 | B1 | 8/2002 | Keillor, III |
| 6,436,461 | B1 | 8/2002 | Bouwmeesters et al. |
| 6,436,899 | B2 | 8/2002 | Portman |
| 6,440,472 | B1 | 8/2002 | Song et al. |
| 6,444,240 | B1 | 9/2002 | Barkalow et al. |
| 6,455,080 | B1 | 9/2002 | Wolf et al. |
| 6,458,427 | B2 | 10/2002 | Bertellotti et al. |
| 6,468,962 | B1 | 10/2002 | Portman |
| 6,471,945 | B2 | 10/2002 | Luo et al. |
| 6,479,071 | B2 | 11/2002 | Holme et al. |
| 6,485,739 | B2 | 11/2002 | Luo et al. |
| 6,551,643 | B2 | 4/2003 | Bernatz et al. |
| 6,555,146 | B1 | 4/2003 | Rapp et al. |
| 6,558,690 | B2 | 5/2003 | Portman |
| 6,558,752 | B2 | 5/2003 | Bellemare et al. |
| 6,562,382 | B1 | 5/2003 | Corriveau et al. |
| 6,592,884 | B2 | 7/2003 | Hofmann et al. |
| 6,601,708 | B1 | 8/2003 | Degady et al. |
| 6,620,243 | B1 | 9/2003 | Bertellotti et al. |
| 6,627,233 | B1 | 9/2003 | Wolf et al. |
| 6,630,182 | B1 | 10/2003 | Warrington et al. |
| 6,685,916 | B1 | 2/2004 | Holme et al. |
| 6,696,044 | B2 | 2/2004 | Luo et al. |
| 6,716,815 | B2 | 4/2004 | Portman |
| 6,733,818 | B2 | 5/2004 | Luo et al. |
| 6,743,453 | B2 | 6/2004 | Warrington et al. |
| 6,759,066 | B2 | 7/2004 | Savage et al. |
| 6,773,716 | B2 | 8/2004 | Ream et al. |
| 6,773,730 | B1 | 8/2004 | Liu et al. |
| 6,776,288 | B2 | 8/2004 | Kopecky |
| 6,780,443 | B1 | 8/2004 | Nakatsu et al. |
| 6,783,783 | B2 | 8/2004 | Clark et al. |
| 6,803,061 | B1 | 10/2004 | Foster |
| 6,811,797 | B1 | 11/2004 | Wolfe et al. |
| 6,838,431 | B2 | 1/2005 | Portman |
| 6,846,500 | B1 | 1/2005 | Luo et al. |
| 6,858,237 | B1 | 2/2005 | Wolfe et al. |
| 6,878,390 | B2 | 4/2005 | Murray et al. |
| 6,964,779 | B1 | 11/2005 | Hayakawa et al. |
| 6,974,597 | B2 | 12/2005 | Ohta et al. |
| 7,022,352 | B2 | 4/2006 | Castro et al. |
| 7,030,273 | B1 | 4/2006 | Sun |
| 7,087,254 | B1 | 8/2006 | Wolfe et al. |
| 7,112,345 | B1 | 9/2006 | McHale et al. |
| 7,115,288 | B2 | 10/2006 | Witkewitz et al. |

(56) References Cited

U.S. PATENT DOCUMENTS

| | | |
|---|---|---|
| 7,189,760 B2 | 3/2007 | Erman et al. |
| 7,244,454 B1 | 7/2007 | Zyck et al. |
| 7,438,942 B2 | 10/2008 | Ortiz De Zaratte et al. |
| 7,442,026 B2 | 10/2008 | Shulski et al. |
| 7,537,792 B2 | 5/2009 | Niekerk et al. |
| 7,578,874 B2 | 8/2009 | Benjamin et al. |
| 7,581,872 B2 | 9/2009 | Allen |
| 7,637,999 B2 | 12/2009 | Struschka et al. |
| 7,641,926 B2 | 1/2010 | Kabse et al. |
| 7,732,020 B2 | 6/2010 | King et al. |
| 7,736,681 B2 | 6/2010 | Belzowski et al. |
| 7,786,191 B2 | 8/2010 | De Koning et al. |
| 7,810,446 B2 | 10/2010 | Degady et al. |
| 8,114,211 B2 | 2/2012 | Handrosch et al. |
| 8,226,401 B2 | 7/2012 | Olejarski et al. |
| 9,060,526 B2 | 6/2015 | Jani |
| 2001/0001512 A1 | 5/2001 | Voss |
| 2001/0002274 A1 | 5/2001 | Lessmeister et al. |
| 2002/0028276 A1 | 3/2002 | Rapp et al. |
| 2002/0034592 A1 | 3/2002 | Hogan et al. |
| 2002/0038160 A1 | 3/2002 | Maynard et al. |
| 2002/0058102 A1 | 5/2002 | Makela et al. |
| 2002/0114863 A1 | 8/2002 | Ream et al. |
| 2002/0192330 A1 | 12/2002 | Bunkers et al. |
| 2002/0197388 A1 | 12/2002 | Brown et al. |
| 2003/0044486 A1 | 3/2003 | Wargocki et al. |
| 2003/0072842 A1 | 4/2003 | Johnson et al. |
| 2003/0099741 A1 | 5/2003 | Gubler |
| 2003/0124228 A1 | 7/2003 | Goto et al. |
| 2003/0124234 A1 | 7/2003 | Hayashi et al. |
| 2003/0157213 A1 | 8/2003 | Jenkins |
| 2003/0161914 A1 | 8/2003 | Sault et al. |
| 2003/0185961 A1 | 10/2003 | Sault et al. |
| 2003/0190397 A1 | 10/2003 | Serpelloni |
| 2003/0206993 A1 | 11/2003 | Gubler |
| 2003/0215417 A1 | 11/2003 | Uchiyama et al. |
| 2004/0081713 A1 | 4/2004 | Maxwell et al. |
| 2004/0096544 A1 | 5/2004 | Yatka et al. |
| 2004/0136928 A1 | 7/2004 | Holme et al. |
| 2004/0234648 A1 | 11/2004 | Mazurek et al. |
| 2005/0008732 A1 | 1/2005 | Gebreselassie et al. |
| 2005/0008747 A1 | 1/2005 | Barkalow et al. |
| 2005/0025721 A1 | 2/2005 | Holme et al. |
| 2005/0047267 A1 | 3/2005 | Gneuss et al. |
| 2005/0091873 A1 | 5/2005 | Maryakhin |
| 2005/0112236 A1 | 5/2005 | Boghani et al. |
| 2005/0202118 A1 | 9/2005 | Johnson et al. |
| 2005/0220867 A1 | 10/2005 | Boghani et al. |
| 2005/0265930 A1 | 12/2005 | Erman et al. |
| 2005/0266091 A1 | 12/2005 | Lyons et al. |
| 2006/0019005 A1 | 1/2006 | Talbot |
| 2006/0024425 A1 | 2/2006 | Barkalow et al. |
| 2006/0034975 A1 | 2/2006 | Schechner et al. |
| 2006/0039872 A1 | 2/2006 | Schmidt |
| 2006/0045934 A1 | 3/2006 | Kabse et al. |
| 2006/0057276 A1 | 3/2006 | Carcasona et al. |
| 2006/0078508 A1 | 4/2006 | Gebreselassie et al. |
| 2006/0078509 A1 | 4/2006 | Gebreselassie et al. |
| 2006/0147585 A1 | 7/2006 | Winckelmann et al. |
| 2006/0165833 A1 | 7/2006 | Muschalik et al. |
| 2006/0228451 A1 | 10/2006 | Martin |
| 2006/0280834 A1 | 12/2006 | Jani et al. |
| 2006/0286220 A1 | 12/2006 | King |
| 2006/0292271 A1 | 12/2006 | King |
| 2007/0014889 A1 | 1/2007 | McHale et al. |
| 2007/0042079 A1 | 2/2007 | Miladinov et al. |
| 2007/0065557 A1 | 3/2007 | Pandey et al. |
| 2007/0082026 A1 | 4/2007 | Aimutis, Jr. et al. |
| 2007/0141198 A1 | 6/2007 | Yang |
| 2007/0148284 A1 | 6/2007 | Jani et al. |
| 2007/0160707 A1 | 7/2007 | Garcia |
| 2007/0218165 A1 | 9/2007 | Castro et al. |
| 2007/0224311 A1 | 9/2007 | Grey et al. |
| 2007/0231424 A1 | 10/2007 | Castro et al. |
| 2007/0231425 A1 | 10/2007 | Ream et al. |
| 2007/0269577 A1 | 11/2007 | Pershad et al. |
| 2008/0014302 A1 | 1/2008 | Elejalde et al. |
| 2008/0050605 A1 | 2/2008 | Rapp et al. |
| 2008/0057154 A1 | 3/2008 | Acar |
| 2008/0057155 A1 | 3/2008 | Luo et al. |
| 2008/0063748 A1 | 3/2008 | Massey et al. |
| 2008/0075830 A1 | 3/2008 | Wen et al. |
| 2008/0085354 A1 | 4/2008 | Paeschke et al. |
| 2008/0095899 A1 | 4/2008 | Fornaguera |
| 2008/0107771 A1 | 5/2008 | Fabre et al. |
| 2008/0152756 A1 | 6/2008 | Ream et al. |
| 2008/0159921 A1 | 7/2008 | Mizumoto et al. |
| 2008/0166449 A1 | 7/2008 | Kabse et al. |
| 2008/0166477 A1 | 7/2008 | Rowe et al. |
| 2008/0199564 A1 | 8/2008 | Boghani et al. |
| 2008/0241319 A1 | 10/2008 | Pandey et al. |
| 2008/0265055 A1 | 10/2008 | Quan et al. |
| 2008/0265056 A1 | 10/2008 | Quan et al. |
| 2009/0029018 A1 | 1/2009 | Elejalde et al. |
| 2009/0053390 A1 | 2/2009 | Sakou et al. |
| 2009/0074924 A1 | 3/2009 | Scudieri et al. |
| 2009/0130251 A1 | 5/2009 | Perry et al. |
| 2009/0155423 A1 | 6/2009 | Moore et al. |
| 2009/0162475 A1 | 6/2009 | Duggan et al. |
| 2009/0162476 A1 | 6/2009 | Duggan et al. |
| 2009/0214719 A1 | 8/2009 | Gouin et al. |
| 2009/0220656 A1 | 9/2009 | Fabre et al. |
| 2009/0238027 A1 | 9/2009 | Yamaguchi et al. |
| 2010/0055264 A1 | 3/2010 | Liniger et al. |
| 2010/0055280 A1 | 3/2010 | Simon |
| 2010/0077956 A1 | 4/2010 | Zuehlke et al. |
| 2010/0136185 A1 | 6/2010 | Miladinov et al. |
| 2010/0166934 A1 | 7/2010 | Caiger et al. |
| 2010/0178382 A1 | 7/2010 | Olejarski et al. |
| 2010/0233332 A1 | 9/2010 | Xing et al. |
| 2011/0052756 A1 | 3/2011 | Cervenka et al. |
| 2011/0104330 A1 | 5/2011 | Colle et al. |
| 2011/0183044 A1 | 7/2011 | Zimmermann et al. |
| 2011/0217427 A1 | 9/2011 | Vaman et al. |
| 2011/0256305 A1 | 10/2011 | Jacques et al. |
| 2012/0207875 A1 | 8/2012 | Aldridge et al. |
| 2012/0207888 A1 | 8/2012 | King |
| 2012/0234942 A1 | 9/2012 | Unosawa et al. |
| 2013/0055907 A1 | 3/2013 | Brandt, Jr. et al. |
| 2013/0209605 A1 | 8/2013 | Adivi et al. |
| 2013/0209606 A1 | 8/2013 | Boudy et al. |
| 2013/0209644 A1 | 8/2013 | Miladinov et al. |
| 2013/0216661 A1 | 8/2013 | Miladinov et al. |
| 2014/0287091 A1 | 9/2014 | Jani et al. |
| 2014/0302195 A1 | 10/2014 | Jani et al. |
| 2014/0302196 A1 | 10/2014 | Jani et al. |
| 2015/0250202 A1 | 9/2015 | Jani |
| 2016/0205965 A1 | 7/2016 | Elejalde et al. |
| 2016/0324183 A1 | 11/2016 | Jani |
| 2016/0330993 A1 | 11/2016 | Grant et al. |
| 2017/0071226 A1 | 3/2017 | Modak |
| 2017/0099854 A1 | 4/2017 | Mecrin et al. |
| 2017/0215455 A1 | 8/2017 | Buck et al. |
| 2017/0251693 A1 | 9/2017 | Miladinov et al. |
| 2017/0258107 A1 | 9/2017 | Miladinov et al. |
| 2017/0265493 A1 | 9/2017 | Miladinov et al. |
| 2019/0230954 A1 | 8/2019 | Jani et al. |

FOREIGN PATENT DOCUMENTS

| | | |
|---|---|---|
| CN | 1048648 A | 1/1991 |
| CN | 1423525 A | 6/2003 |
| CN | 101448407 A | 6/2009 |
| CN | 101453904 A | 6/2009 |
| CN | 101478885 A | 7/2009 |
| CN | 101557714 A | 10/2009 |
| CN | 101708026 A | 5/2010 |
| CN | 101873803 A | 10/2010 |
| CN | 102046020 A | 5/2011 |
| DE | 3933745 A1 | 4/1991 |
| DE | 10035461 B4 | 3/2004 |
| DE | 10338217 B3 | 1/2005 |
| EA | 0007647 B1 | 12/2006 |
| EP | 2712506 A1 | 9/1978 |

(56) References Cited

FOREIGN PATENT DOCUMENTS

| | | |
|---|---|---|
| EP | 0150934 A2 | 7/1985 |
| EP | 0231984 A2 | 8/1987 |
| EP | 0273809 A2 | 7/1988 |
| EP | 0438923 A1 | 7/1991 |
| EP | 0657101 A1 | 6/1995 |
| EP | 0732057 A1 | 9/1996 |
| EP | 0941768 A2 | 9/1999 |
| EP | 0979714 | 2/2000 |
| EP | 1250847 | 10/2002 |
| EP | 1264544 A2 | 12/2002 |
| EP | 0759703 B1 | 9/2003 |
| EP | 1410718 A1 | 4/2004 |
| EP | 1514483 A1 | 3/2005 |
| EP | 1061814 B1 | 8/2006 |
| EP | 1894476 | 3/2008 |
| EP | 1894476 A2 | 3/2008 |
| EP | 2206437 | 7/2010 |
| EP | 2260717 A1 | 12/2010 |
| EP | 2774492 A2 | 9/2014 |
| FR | 2350146 A2 | 12/1977 |
| FR | 2635441 A1 | 2/1990 |
| GB | 359458 A | 10/1931 |
| GB | 639695 A | 7/1950 |
| GB | 746101 A | 3/1956 |
| GB | 831028 | 3/1960 |
| GB | 1441446 A | 6/1976 |
| GB | 1497507 A | 1/1978 |
| GB | 2034572 A | 6/1980 |
| GB | 2042969 A | 10/1980 |
| GB | 2120517 A | 12/1983 |
| GB | 2124468 A | 2/1984 |
| JP | S4706226 Y1 | 3/1972 |
| JP | S52082756 A | 7/1977 |
| JP | S52082758 A | 7/1977 |
| JP | S54049367 A | 4/1979 |
| JP | S55135548 A | 10/1980 |
| JP | S5862898 U | 4/1983 |
| JP | S58111644 A | 7/1983 |
| JP | S59163381 | 11/1984 |
| JP | S60186250 A | 9/1985 |
| JP | S6128391 U | 2/1986 |
| JP | 61162136 | 7/1986 |
| JP | S61181367 A | 8/1986 |
| JP | 63177758 A | 1/1987 |
| JP | S62205753 A | 9/1987 |
| JP | S62224275 A | 10/1987 |
| JP | 63273438 | 11/1988 |
| JP | 6460332 A | 3/1989 |
| JP | 02286307 A | 11/1990 |
| JP | H04179445 A | 6/1992 |
| JP | H04215867 A | 8/1992 |
| JP | H0646760 A | 2/1994 |
| JP | H06189689 A | 7/1994 |
| JP | 07067554 A | 3/1995 |
| JP | H07233046 A | 9/1995 |
| JP | H0923862 A | 1/1997 |
| JP | 09065833 | 3/1997 |
| JP | 2000004792 A | 1/2000 |
| JP | 2000166477 A | 6/2000 |
| JP | 2002017266 A | 1/2002 |
| JP | 2002045117 A | 2/2002 |
| JP | 2002176904 | 6/2002 |
| JP | 2002516672 A | 6/2002 |
| JP | 2004141004 A | 5/2004 |
| JP | 2004517627 A | 6/2004 |
| JP | 2004314106 A | 11/2004 |
| JP | 2004321096 A | 11/2004 |
| JP | 2006102571 A | 4/2006 |
| JP | 2006204185 A | 8/2006 |
| JP | 2006345781 A | 12/2006 |
| JP | 2007000798 A | 1/2007 |
| JP | 2007028951 A | 2/2007 |
| JP | 2007029018 A | 2/2007 |
| JP | 2007215450 A | 8/2007 |
| JP | 2008539804 A | 11/2008 |
| JP | 2010011875 A | 1/2010 |
| JP | 4461255 B2 | 5/2010 |
| JP | 4711754 B2 | 6/2011 |
| KR | 20090039105 | 4/2009 |
| KR | 100919653 | 9/2009 |
| RU | 2214720 | 10/2003 |
| RU | 2325071 C1 | 5/2008 |
| SU | 839470 A1 | 6/1981 |
| WO | 94/22323 A1 | 10/1994 |
| WO | 9734708 A1 | 9/1997 |
| WO | 9945791 A1 | 9/1999 |
| WO | 0215708 A2 | 2/2002 |
| WO | 200217851 A2 | 3/2002 |
| WO | WO02056697 A1 | 7/2002 |
| WO | 03047360 A1 | 6/2003 |
| WO | 2004073691 A1 | 9/2004 |
| WO | 2004112971 A1 | 12/2004 |
| WO | 2005089255 A2 | 9/2005 |
| WO | 2006125334 A1 | 11/2006 |
| WO | 2006127277 A2 | 11/2006 |
| WO | 2007056685 A2 | 5/2007 |
| WO | 2007076170 A2 | 7/2007 |
| WO | 2009036954 A1 | 3/2009 |
| WO | 2009070570 A1 | 6/2009 |
| WO | 2009108769 A2 | 9/2009 |
| WO | 2009135100 A1 | 11/2009 |
| WO | 2009140351 A2 | 11/2009 |
| WO | 2009151506 | 12/2009 |
| WO | 2010/006385 A1 | 1/2010 |
| WO | 2010062866 A2 | 6/2010 |
| WO | 2010062867 A2 | 6/2010 |
| WO | 2010092480 A1 | 8/2010 |
| WO | 2011044373 A2 | 4/2011 |
| WO | 2011063082 A2 | 5/2011 |
| WO | 2010/084759 A2 | 7/2011 |
| WO | 2011084759 A2 | 7/2011 |
| WO | 2011090520 | 7/2011 |
| WO | 2011117634 A2 | 9/2011 |
| WO | 2011154398 A1 | 12/2011 |
| WO | 2011159935 A1 | 12/2011 |
| WO | 2012125397 A2 | 9/2012 |
| WO | 2013013045 A2 | 1/2013 |
| WO | 2013049800 A2 | 4/2013 |

OTHER PUBLICATIONS

RU OA_2012135675 dated Apr. 23, 2014 with English Translation.
RU OA 2012135675 dated Feb. 3, 2014 with English translation.
CN 2d OA_201080065664.6 dated Jun. 24, 2014.
Non-Final Office Action, U.S. Appl. No. 14/004,343, dated Jul. 3, 2014.
AU ER Application No. 2012229325 dated Jul. 11, 2014.
CN OA Application No. 201280022799.3 dated Jul. 7, 2014 with English Translation.
Decision of Granting, 2012135675/13(057620), dated Aug. 15, 2014, with English Translation.
ISR & WO PCT/US2014/034032 dated Sep. 8, 2014.
Notice of Allowance, Japanese Patent Application No. 2012-549982, dated Oct. 7, 2014, with English Translation.
Canadian Application No. 2,787,148, Office Action dated May 20, 2014.
U.S. Appl. No. 13/522,767, Non-Final Office Action dated Nov. 10, 2014.
CA OA dated Jan. 16, 2015, Application No. 2,829,351.
CN OA dated Dec. 31, 2014, Application No. 201080065664.6, with English Translation.
JP OA dated Jan. 13, 2015, Application No. 2014521788, with English Translation.
JP OA dated Nov. 18, 2014, Application No. 2013-557853, with English Translation.
JP OA dated Jan. 20, 2015, Application No. 2014-521789, with English Translation.
RU OA dated Jan. 20, 2014, with English Translation, Application No. 2013145559.
CN OA Application No. 201280046229.8 dated Jan. 19, 2018.
CN OA Application No. 201280046231.5 dated Jan. 14, 2015.

(56) References Cited

OTHER PUBLICATIONS

JP OA Application No. 2014-521785 dated Feb. 3, 2015.
U.S. Non-Final Office Action dated Feb. 26, 2015.
CN OA Application No. 201280046306.X dated Feb. 2, 2015, with English Translation.
ISR PCT/US2013/060584 dated Nov. 25, 2013.
The State Intellectual Property Office of P. R. China, Office Action, dated Mar. 12, 2015, 6 pages.
Australian Government; IP Australia; Notice of Acceptance; dated Jun. 25, 2015; 2 pages.
Decision of Rejection; Japanese Patent Office; JP Patent Application No. 2013-557853; dated Jun. 2, 2015; 4 pages.
Gorodissky; Official Action; Application No. 2014106422; dated May 14, 2015; 4 pages.
United States Patent and Trademark Office; Final Office Action, dated Jun. 3, 2015, U.S. Appl. No. 13/522,767, 31 pages.
U.S. Appl. No. 60/618,222, filed Oct. 13, 2004, expired; parent of US20060078508 and US2006078509.
Anonymous: "Bar Manufacturing," Sollich, Nov. 17, 2007 (Nov. 17, 2007), XP002678488, Retrieved from the Internet: URL:http://web.archive.org/web/20061117002445/http://www.sollich.com/webEnglisch/produkte/riegelherstellung/conbarsuesswaren.php?navid=7 [retrieved on Jun. 25, 2012] the whole document.
OA CN Patent Application 201080065664.6 dated Apr. 3, 2013.
Database FSTA [Online] International Food Information Service (IFIS), Frankfurt-Main, DE; 1992, Anaonymous: "How gum is made.", XP002687037, Database accession No. FS-1992-09-K-0010 abstract.
EP SR Application No. 10844138.7-1357 / 2525667 dated Oct. 14, 2013.
AU ER Pattent Application No. 2010343332 dated Jun. 3, 2013.
IRPR PCT/US2012/028232 dated Sep. 17, 2013.
ISR PCT/US2012/047404 dated Feb. 27, 2013.
ISR PCT/US2012/047409 dated Feb. 27, 2013.
ISR PCT/US2012/047411 dated Feb. 27, 2013.
ISR Jun. 29, 2011 PCT/US/2010/051085.
ISR PCTUS2012028232_WO2012125397A9_dated Mar. 1, 2013.
CN OA 201080065664.6 dated Aug. 9, 2013.
JP OA 2012-549982 dated Sep. 17, 2013.
CA OA Application No. 2,787,148 / File No. 13427-852—dated Aug. 14, 2013.
Written Opinion dated Jun. 29, 2011 PCT US2010 051085.
Database FSTA [Online] International Food Information Service (IFIS), Frankfurt-Main, DE; 1992, Anonymous: "How gum is made.", XP002687037, Database accession No. FS-1992-09-K-0010 abstract.
IPRP and Written Opinion PCT/US2012/047411 dated Jan. 21, 2014.
IPRP and Written Opinion PCT/US2012/047404 dated Jan. 21, 2014.
IPRP and Written Opinion PCT/US2012/047409 dated Jan. 21, 2014.
Anonymous: "Sugar Free Gum Product", GNPD, May 1, 2011, XP055397367, pp. 1-3; Retrieved from the Internet: URL: www.gnpd.com/sinatra/recordpage/1550406 [retrieved on Aug. 9, 2017].
Anonymous: "Wild Strawberry & Tangy Citrus Sugar-Free Gum," GNPD, Feb. 1, 2010 (Feb. 1, 2010), XP055397371, pp. 1-3; Retrieved from the Internet: URL: www.gnpd.com/sinatra/recordpage/1263179; [retrieved on Aug. 9, 2017].
AU 1st Office Action, AU Application No. 2009319826; dated Jul. 2, 2012, pp. 1-4.
AU 1st Office Action, AU Application No. 2009319827; dated Jul. 25, 2012, pp. 1-4.
AU 1st Office Action, AU Application No. 2009321276; dated Jun. 21, 2012, pp. 1-4.
AU 1st Office Action, AU Application No. 2013206311; dated Apr. 24, 2014, pp. 1-6.
AU 1st Office Action, AU Application No. 2015203194; dated Jan. 22, 2016, pp. 1-5.
AU 2nd Office Action, AU Application No. 2009319826; dated Oct. 10, 2012, pp. 1-4.
AU 2nd Office Action, AU Application No. 2009321276; dated Oct. 11, 2012, pp. 1-3.
AU 2nd Office Action, AU Application No. 2013206311; dated Nov. 26, 2014, pp. 1-5.
AU Notice of Acceptance; AU Application No. 2010343332; dated May 8, 2014, pp. 1-2.
AU Notice of Allowance, AU Application No. 2009319826; dated Apr. 2, 2013, pp. 1-1.
AU Notice of Allowance, AU Application No. 2009319827; dated Nov. 9, 2012, pp. 1-3.
AU Notice of Allowance, AU Application No. 2009321276; dated Feb. 28, 2013, pp. 1-3.
AU Notice of Allowance, AU Application No. 2013206311; dated Feb. 19, 2015, pp. 1-2.
Cerestra, "Polyols in Food," Denbigh Lloyd, Aug. 2001, pp. 1-12.
CN 1st Office Action with translation; CN Application No. 200980155688.8; dated Nov. 5, 2012, pp. 1-28.
CN 1st Office Action with translation; CN Application No. 200980155689.2; dated Nov. 19, 2012, pp. 1-26.
CN 1st Office Action with translation; CN Application No. 200980155690.5; dated Oct. 29, 2012, pp. 1-14.
CN 1st Office Action with translation; CN Application No. 201180037795.8; dated Aug. 26, 2013, pp. 1-16.
CN 1st Office Action with translation; CN Application No. 201180037796.2; dated Aug. 26, 2013, pp. 1-12.
CN 1st Office Action with translation; CN Application No. 201380046385.9; dated Jan. 15, 2016, pp. 1-19.
CN 2nd Office Action with translation, CN Application No. 201280046306.X; dated Nov. 2, 2015, pp. 1-31.
CN 2nd Office Action with translation; CN Application No. 200980155688.8; dated Sep. 12, 2013, pp. 1-21.
CN 2nd Office Action with translation; CN Application No. 200980155689.2; dated Jul. 10, 2013, pp. 1-17.
CN 2nd Office Action with translation; CN Application No.200980155690.5; dated Jun. 24, 2013, pp. 1-31.
CN 2nd Office Action with translation; CN Application No. 201280046229.8; dated Sep. 24, 2015, pp. 1-9.
CN 2nd Office Action with translation; CN Application No. 201280046231.5; dated Oct. 10, 2015, pp. 1-16.
CN 2nd Office Action with translation; CN Application No. 201380046385.9; dated Sep. 6, 2016, pp. 1-6.
CN 3rd Office Action with translation; CN Application No. 200980155688.8; dated Apr. 19, 2016, pp. 1-24.
CN 3rd Office Action with translation; CN Application No. 200980155690.5; dated Nov. 14, 2013, pp. 1-17.
CN 3rd Office Action with translation; CN Application No. 201280046231.5; dated Mar. 9, 2016, pp. 1-6.
CN 4th Office Action with translation; CN Application No. 200980155688.8; dated Oct. 28, 2016, pp. 1-12.
CN Decision of Rejection with translation, CN Application No. 201280046306.X; dated May 4, 2016, pp. 1-20.
CN Decision of Rejection with translation; CN Application No. 200980155688.8; dated Feb. 7, 2014, pp. 1-20.
CN Decision of Rejection with translation; CN Application No. 201280046229.8; dated Apr. 14, 2016, pp. 1-7.
CN Decision of Rejection with translation; CN Application No. 201280046231.5; dated Sep. 7, 2016, pp. 1-14.
CN Notice of Allowance with translation, CN Application No. 201280022799.3, dated Sep. 9, 2015, pp. 1-4.
CN Notice of Allowance with translation, CN Application No. 200980155688.8; dated May 4, 2017, pp. 1-4.
CN Notice of Allowance with translation; CN Application No. 200980155689.2; dated Dec. 12, 2013, pp. 1-4.
CN Notice of Allowance with translation; CN Application No. 200980155690.5; dated Apr. 30, 2014, pp. 1-4.
CN Notice of Allowance with translation; CN Application No. 201080065664.6; dated Jul. 8, 2015 , pp. 1-6.
CN Notice of Allowance with translation; CN Application No. 201180037795.8; dated Mar. 17, 2014, pp. 1-4.
CN Notice of Allowance with translation; CN Application No. 201180037796.2; dated Mar. 17, 2014, pp. 1-14.

(56) References Cited

OTHER PUBLICATIONS

CN Notice of Allowance with translation; CN Application No. 201380046385.9; dated Mar. 15, 2017, pp. 1-4.
CN Notification of the Reexamination with translation for CN Patent Application No. 201280046231.5 dated Jul. 28, 2017.
CN Notification of the Reexamination with translation, CN Application No. 201280046306.X; dated May 12, 2017, pp. 1-22.
CN Notification of the Reexamination with translation; CN Application No. 201280046229.8; dated Feb. 16, 2017, pp. 1-7.
CN Notificiation of the Reexamination with translation, CN Application No. 201280046306.X; dated Dec. 22, 2016, pp. 1-20.
CN Request for Reexamination with translation; CN Application No. 201280046231.5; dated Dec. 22, 2016, pp. 1-2.
Flanyak, "Panning Technology, An Overview", The Manufacturing Confectioner, pp. 65-74, Jan. 1998.
International Search Report; International Application No. PCT/US2014/052614; International Filing Date: Aug. 26, 2014; dated Nov. 20, 2014; 4 Pages.
IPRP; International Application No. PCT/IB2009/007718; International Filing Date: Nov. 24, 2009, dated May 31, 2011, pp. 1-5.
IPRP; International Application No. PCT/US2009/065594; International Filing Date: Nov. 24, 2009, dated Sep. 27, 2011, pp. 1-8.
IPRP; International Application No. PCT/US2011/038738; International Filing Date: Jun. 1, 2011, dated Dec. 4, 2012, pp. 1-7.
IPRP; International Application No. PCT/US2011/038747; International Filing Date: Jun. 1, 2011, dated Dec. 4, 2012, pp. 1-9.
IPRP; International Application No. PCT/US2014/072708; International Filing Date: Dec. 30, 2014, dated Jul. 5, 2016, pp. 1-7.
IPRP; International Application No. PCT/US2015/018072; International Filing Date: Feb. 27, 2015, dated Sep. 6, 2016, pp. 1-9.
IPRP; International Application No. PCT/US2015/031074; International Filing Date: May 15, 2015, dated Nov. 22, 2016, pp. 1-7.
IPRP; International Application No. PCT/US2015/031742; International Filing Date: May 20, 2015, dated Nov. 22, 2016, pp. 1-9.
Japanese Office Action with Translation; JP Application No. 2016-535722; dated Nov. 14, 2017; pp. 1-5.
JP 1st Office Action and translation, JP Application No. 2016-550532; dated Jun. 19, 2017, pp. 1-11.
JP 1st Office Action with translation, JP Application No. 2011-538074; dated Feb. 5, 2013, pp. 1-7.
JP 1st Office Action with translation, JP Application No. 2011-538658; dated Feb. 5, 2013, pp. 1-7.
JP 1st Office Action with translation, JP Application No. 2011-538659; dated Feb. 19, 2013, pp. 1-6.
JP 1st Office Action with translation, JP Application No. 2013-256761; dated Mar. 10, 2015, pp. 1-6.
JP 1st Office Action with translation, JP Application No. 2013-513299; dated Feb. 4, 2014, pp. 1-7.
JP 1st Office Action with translation, JP Application No. 2013-513302; dated Feb. 4, 2014, pp. 1-7.
JP 1st Office Action with translation, JP Application No. 2014-171916; dated Oct. 13, 2015, pp. 1-4.
JP 1st Office Action with translation, JP Application No. 2015-527688; dated Feb. 3, 2016, pp. 1-10.
JP 1st Office Action with translation, JP Application No. 2016-045354; dated Jan. 17, 2017, pp. 1-7.
JP 1st Office Action with translation, JP Application No. 2016-045867; dated Jan. 17, 2017, pp. 1-6.
JP 1st Office Action with translation, JP Application No. 2016-130735; dated Apr. 25, 2017, pp. 1-11.
JP 1st Office Action with translation, JP Application No. 2016-249450; dated Jan. 9, 2018, pp. 1-4.
JP 1st Office Action with translation, JP Application No. 2016-535722; dated Mar. 29, 2017, pp. 1-8.
JP 1st Office Action with translation, JP Application No. 2016-535710; dated May 25, 2017, pp. 1-5.
JP 2nd Office Action with translation, JP Application No. 2011-538074; dated Aug. 20, 2013, pp. 1-3.
JP 2nd Office Action with translation, JP Application No. 2011-538658; dated Aug. 6, 2013, pp. 1-6.
JP 2nd Office Action with translation, JP Application No. 2011-538659; dated Feb. 4, 2014, pp. 1-6.
JP 2nd Office Action with translation, JP Application No. 2013-513299; dated Oct. 14, 2014, pp. 1-5.
JP 2nd Office Action with translation, JP Application No. 2013-513302; dated Oct. 14, 2014, pp. 1-4.
JP 2nd Office Action with translation, JP Application No. 2014-521785; dated Nov. 10, 2015, pp. 1-4.
JP 2nd Office Action with translation, JP Application No. 2014-521788; dated Nov. 10, 2015, pp. 1-4.
JP 2nd Office Action with translation, JP Application No. 2014-521789; dated Oct. 6, 2015, pp. 1-4.
JP 3rd Office Action with translation, JP Application No. 2011-538074; dated Apr. 7, 2015, pp. 1-9.
JP 3rd Office Action with translation, JP Application No. 2011-538658; dated May 7, 2014, pp. 1-7.
JP 3rd Office Action with translation, JP Application No. 2011-538659; dated Nov. 25, 2014, pp. 1-3.
JP 3rd Office Action with translation, JP Application No. 2014-521785; dated Feb. 28, 2017, pp. 1-11.
JP 3rd Office Action with translation, JP Application No. 2014-521788; dated May 9, 2017, pp. 1-25.
JP OA with translation, JP Application No. 2016-559836 dated Sep. 4, 2017, pp. 1-14.
JP OA with translation, JP Application No. 2016-552229 dated Sep. 21, 2017, pp. 1-7.
JP Pre-Appeal Report with translation, JP Application No. 2013-557853; dated Dec. 15, 2015, pp. 1-5.
JPD 1st Office Action with translation, JP Application No. 2014-139188; dated Jul. 28, 2015, pp. 1-4.
JPD 1st Office Action with translation, JP Application No. 2015-196927; dated Jul. 12, 2016, pp. 1-11.
JPD 2nd Office Action with translation, JP Application No. 2014-139188; dated Jan. 19, 2016, pp. 1-5.
JPD 2nd Office Action with translation, JP Application No. 2015-196927; dated May 9, 2017, pp. 1-9.
Lynch, "Soft Panning", The Manufacturing Confectioner, pp. 47-50, Nov. 1987.
Mexican 1st Office Action with translation, MX Application No. MX/a/2013/010024; dated Jul. 29, 2015, pp. 4.
Mexican Office Action with Translation; MX Application No. MX/a/2014/000794; dated Nov. 3, 2017, pp. 1-9.
CN Summary of the Decision of Reexamination with translation; CN Application No. 201280046229.8; dated Jun. 22, 2017, pp. 1-10.
E.B. Jackson, "Sugar Confectionery Manufacture," Blackie and Son Ltd. 1990, pp. 1-20.
Ep Communication Extended European Search Report; Application No. 17185358.3-1375; dated Oct. 4, 2017, pp. 1-8.
EP Communication Pursuant to Aricle 94(3) EPC, Application No. 12 741 210.4-1358; dated May 12, 2017, pp. 1-8.
EP Communication Pursuant to Aricle 94(3) EPC, Application No. 12 741 210.4-1358; dated Sep. 15, 2016, pp. 1-8.
EP Communication Pursuant to Aricle 94(3) EPC; Application No. 12 741 209.6-1358; dated May 12, 2017, pp. 1-6.
EP Communication Pursuant to Aricle 94(3) EPC; Application No. 12 741 209.6-1358; dated Sep. 15, 2016, pp. 1-10.
EP Communication Pursuant to Article 94(3) EPC; Application No. 09 756 643.4-1358; dated Jul. 12, 2017, pp. 1-4.
EP Communication Pursuant to Article 94(3) EPC; Application No. 09 756 643.4-1358; dated Oct. 6, 2016, pp. 1-7.
EP Communication Pursuant to Article 94(3) EPC; Application No. 09 810 783.2-1358; dated Oct. 6, 2016, pp. 1-4.
EP Communication Pursuant to Article 94(3) EPC; Application No. 10 844 138.7-1375; dated Feb. 22, 2017, pp. 1-6.
EP Communication Pursuant to Article 94(3) EPC; Application No. 11 726 558.7-1358; dated May 18, 2015, pp. 1-5.
EP Communication Pursuant to Article 94(3) EPC; Application No. 11 781 895.5-1358; dated May 22, 2015, pp. 1-4.
EP Communication Pursuant to Article 94(3) EPC; Application No. 12 709 260.9-1358; dated Feb. 1, 2017, pp. 1-4.
EP Communication Pursuant to Article 94(3) EPC; Application No. 12 741 209.6-1358; dated Dec. 20, 2017, pp. 1-6.

(56) References Cited

OTHER PUBLICATIONS

EP Communication Pursuant to Article 94(3) EPC; Application No. 12 741 211.2-1358; dated Mar. 23, 2017; pp. 1-6.
EP Communication Pursuant to Article 94(3) EPC; Application No. 12 741 211.2-1358; dated Sep. 15, 2016; pp. 1-7.
EP Communication Pursuant to Article 94(3) EPC; Application No. 14 824 334.8-1375; dated Aug. 17, 2017; pp. 1-14.
EP Communication Pursuant to Article 94(3) EPC; Application No. 14 824 335.5-1375; dated Nov. 13, 2017; pp. 1-7.
EP Communication Pursuant to Rules 161(1) and 162 EPC; Application No. 09756643.4-2114 PCT/US2009065594; dated Nov. 25, 2011, pp. 1-8.
EP Communication Pursuant to Rules 161(1) and 162 EPC; Application No. 09810783.2-2114 PCT/IB2009007718; dated Jul. 21, 2011, pp. 1-2.
EP Communication Pursuant to Rules 161(1) and 162 EPC; Application No. 11726558.7-2114; dated Jan. 9, 2013, pp. 1-2.
EP Communication Pursuant to Rules 161(1) and 162 EPC; Application No. 11781895.5-2114; dated Jan. 9, 2013, pp. 1-2.
EP Communication Pursuant to Rules 161(1) and 162 EPC; Application No. 12741209.6-1358; dated Feb. 28, 2014, pp. 1-2.
EP Communication Pursuant to Rules 161(1) and 162 EPC; Application No. 12741210.4-1358; dated Feb. 28, 2014, pp. 1-2.
EP Communication Pursuant to Rules 161(1) and 162 EPC; Application No. 12741211.2-1358; dated Feb. 28, 2014, pp. 1-2.
EP Communication Pursuant to Rules 161(1) and 162 EPC; Application No. 13771024.0-1357; dated Apr. 29, 2015, pp. 1-2.
EP Communication Pursuant to Rules 161(1) and 162 EPC; Application No. 14723283.9-1357; dated Nov. 24, 2015, pp. 1-2.
EP Communication Pursuant to Rules 161(1) and 162 EPC; Application No. 14824334.8-1375; dated Aug. 10, 2016, pp. 1-2.
EP Communication Pursuant to Rules 161(1) and 162 EPC; Application No. 14824335.5-1375; dated Aug. 10, 2016, pp. 1-2.
EP Communication Pursuant to Rules 161(1) and 162 EPC; Application No. 15709397.2-1358; dated Oct. 14, 2016, pp. 1-2.
EP Communication Pursuant to Rules 161(1) and 162 EPC; Application No. 15728967.9-1358; dated Jan. 20, 2017, pp. 1-2.
EP Communication Pursuant to Rules 161(1) and 162 EPC; Application No. 15729600.5-1375; dated Dec. 23, 2016, pp. 1-2.
EP Communication under Rule 71(3) EPC; Application No. 09 810 783.2-1358; dated Apr. 19, 2017, pp. 1-8.
EP Communication under Rule 71(3) EPC; Application No. 10 250 033.7-2114; dated Jul. 23, 2012; pp. 1-5.
EP Communication under Rule 71(3) EPC; Application No. 11 726 558.7-1358; dated Dec. 9, 2015, pp. 1-9.
EP Communication under Rule 71(3) EPC; Application No. 11 781 895.5-13588; dated Jul. 29, 2015, pp. 1-7.
EP Communication under Rule 71(3) EPC; Application No. 13 771 024.0-1375; dated Apr. 28, 2017; pp. 1-7.
EP Communication under Rule 94(3) EPC; Application No. 10 250 033.7-2114; dated Feb. 10, 2011; pp. 1-7.
EP Communication under Rule 94(3) EPC; Application No. 10 250 033.7-2114; dated Mar. 19, 2012; pp. 1-3.
EP Communication under Rule 94(3) EPC; Application No. 14 723 283.9-1375; dated Feb. 6, 2016; pp. 1-2.
Food Protection Committee, "Chemicals Used in Food Processing", National Academy of Sciences, 1965, pp. 1-101.
International Preliminary Report on Patentability issued in PCT/US2008/087618 dated Jun. 22, 2010.
International Preliminary Report on Patentability issued in PCT/US2008/087625 dated Jun. 22, 2010.
International Preliminary Report on Patentability issued in PCT/US2014/052614 dated Mar. 1, 2016.
EP Examination Report; EP Application No. 15728967.9-1106; dated Apr. 30, 2018; 4 pages.
JP 2nd Office Action, Japanese Patent Application No. 2016-550532; dated Apr. 27, 2018, 12 pages.
MX 2nd Office Action, Mexican Patent Application No. MX/a/2014/000795; dated Apr. 11, 2018, 8 pages.
International Search Report; International Application No. PCT/US2015/031742; International Filing Date: May 20, 2015; dated Dec. 16, 2015; 7 Pages.
MX 1st Office Action and Translation; Mexican Application No. MX/a/2014/000795; dated Oct. 31, 2017; pp. 1-11.
MX 1st Office Action and Translation; Mexican Application No. MX/a/2014/000819; dated Oct. 23, 2017; pp. 1-7.
MX 1st Office Action with Translation; Mexican Patent Application No. MX/a/2012/008505; dated Aug. 7, 2015, pp. 1-7.
MX 1st Office Action; Mexican Patent Application No. MX/a/2011/005647; dated Aug. 30, 2013, pp. 1-7.
MX 1st Office Action; Mexican Patent Application No. MX/a/2011/005652; dated Jun. 17, 2015, pp. 1-12.
MX 1st Office Action; Mexican Patent Application No. MX/a/2011/005693; dated Jul. 17, 2013, pp. 1-3.
MX 1st Office Action; Mexican Patent Application No. MX/a/2012/013889; dated Jan. 27, 2016, pp. 1-4.
MX 1st Office Action; Mexican Patent Application No. MX/a/2012/013982; dated Jan. 21, 2016, pp. 1-5.
MX 2nd Office Action with translation; Mexican Patent Application No. MX/a/2012/008505; dated Feb. 19, 2016, pp. 1-7.
MX 2nd Office Action; Mexican Patent Application No. MX/a/2011/005652; dated Sep. 23, 2015, pp. 1-4.
MX 3rd Office Action with translation; Mexican Patent Application No. MX/a/2012/008505; dated Oct. 25, 2016, pp. 1-9.
MX 4th Office Action with translation; Mexican Patent Application No. MX/a/2012/008505; dated Jun. 27, 2017, pp. 1-7.
PCT IPRP; International Application No. PCT/US2010/051085; International Filing Date: Oct. 1, 2010, dated Aug. 2, 2012; pp. 1-8.
PCT IPRP; International Application No. PCT/US2013/060584; International Filing Date: Sep. 19, 2013, dated Mar. 24, 2015; pp. 1-6.
PCT IPRP; International Application No. PCT/US2014/034032; International Filing Date: Apr. 14, 2014, dated Oct. 20, 2015; pp. 1-9.
PCT IPRP; International Application No. PCT/US2014/072702; International Filing Date: Dec. 30, 2014, dated Jul. 5, 2016, pp. 1-11.
PCT Notification of Transmittal of The International Search Report; International Application No. PCT/IB2009/007718; International Filing Date: Nov. 24, 2009, dated May 21, 2010, pp. 1-6.
PCT Notification of Transmittal of The International Search Report; International Application No. PCT/US2009/065594; International Filing Date: Nov. 24, 2009, dated Sep. 22, 2011, pp. 1-6.
PCT Notification of Transmittal of The International Search Report; International Application No. PCT/US2011/038738; International Filing Date: Jun. 1, 2011, dated Feb. 6, 2012, pp. 1-5.
PCT Notification of Transmittal of The International Search Report; International Application No. PCT/US2011/038747; International Filing Date: Jun. 1, 2011, dated Sep. 6, 2011, pp. 1-5.
PCT Notification of Transmittal of The International Search Report; International Application No. PCT/US2014/072702; International Filing Date: Dec. 30, 2014, dated Mar. 16, 2015, pp. 1-5.
PCT Notification of Transmittal of The International Search Report; International Application No. PCT/US2014/072708; International Filing Date: Dec. 30, 2014, dated Mar. 3, 2015, pp. 1-4.
PCT Notification of Transmittal of The International Search Report; International Application No. PCT/US2015/018072; International Filing Date: Feb. 27, 2015, dated Jun. 17, 2015, pp. 1-6.
PCT Notification of Transmittal of The International Search Report; International Application No. PCT/US2015/031074; International Filing Date: May 15, 2015, dated Sep. 15, 2015, pp. 1-5.
PCT Written Opinion; International Application No. PCT/IB2009/007718; International Filing Date: Nov. 24, 2009, dated May 21, 2010, pp. 1-4.
PCT Written Opinion; International Application No. PCT/US2009/065594; International Filing Date: Nov. 24, 2009, dated Sep. 22, 2011, pp. 1-7.
PCT Written Opinion; International Application No. PCT/US2011/038738; International Filing Date: Jun. 1, 2011, dated Feb. 6, 2012, pp. 1-7.

(56) References Cited

OTHER PUBLICATIONS

PCT Written Opinion; International Application No. PCT/US2011/038747; International Filing Date: Jun. 1, 2011, dated Sep. 6, 2011, pp. 1-7.
PCT Written Opinion; International Application No. PCT/US2012/028232; International Filing Date: Mar. 8, 2012, dated Nov. 16, 2012, pp. 1-10.
PCT Written Opinion; International Application No. PCT/US2012/047404; International Filing Date: Jul. 19, 2012, dated Feb. 27, 2013, pp. 1-11.
PCT Written Opinion; International Application No. PCT/US2012/047411; International Filing Date: Jul. 19, 2012, dated Feb. 27, 2013, pp. 1-11.
PCT Written Opinion; International Application No. PCT/US2013/060584; International Filing Date: Sep. 19, 2013, dated Nov. 25, 2013, pp. 1-6.
PCT Written Opinion; International Application No. PCT/US2014/072702; International Filing Date: Dec. 30, 2014, dated Mar. 16, 2015, pp. 1-10.
PCT Written Opinion; International Application No. PCT/US2014/072708; International Filing Date: Dec. 30, 2014, dated Mar. 3, 2015, pp. 1-6.
PCT Written Opinion; International Application No. PCT/US2015/018072; International Filing Date: Feb. 27, 2015, dated Jun. 17, 2015, pp. 1-8.
PCT Written Opinion; International Application No. PCT/US2015/031074; International Filing Date: May 15, 2015, dated Sep. 15, 2015, pp. 1-6.
PCT Written Opinion; International Application No. PCT/US2015/031742; International Filing Date: May 20, 2015, dated Dec. 16, 2015, pp. 1-8.
William Raleigh, "HSH as a Bulking Agent in Confections," The Manufacturing Confectioner, Nov. 1995, pp. 57-59.
Written Opinion of the International Searching Authority; International Application No. PCT/US2008/087618 dated Apr. 8, 2009.
Written Opinion of the International Searching Authority; International Application No. PCT/US2008/087625 dated Apr. 7, 2009.
Written Opinion of the International Searching Authority; International Application No. PCT/US2014/052614; International Filing Date: Aug. 26, 2014; dated Nov. 20, 2014; 8 Pages.
Hartel, "Crystallization and Drying During Hard Panning", The Manufacturing Confectioner, pp. 51-57, Feb. 1995.
PCT Written Opnion; Internatinal Application No. PCT/US2012/047409; International Filing Date: Jul. 19, 2012, dated Feb. 27, 2013, pp. 1-10.
Robert Boutin, et al., "Sugarless Hard Panning," The Manufacturing Confectioner, pp. 35-42, Nov. 2004.
Robert D. Walter, "Panning—the specialist's specialty" Part 1;Candy & Snack Industry, pp. 43-51; Dec. 1974.
Robert D. Walter, "Panning—the Specialist's Specialty"; Part 2; Candy & Snack Industry; pp. 44-51; Jan. 1975.
Robert L. Davidson, "Handbook of Water-Soluble Gums and Resins," Handbook of Water-Soluble Gums and Resins, Jun. 5, 1980, Chapter 24, Xanthan Gum, pp. 1-33.
RU 1st Office Action with translation, RU Application No. 2014106418/13(010180); dated Jul. 3, 2015, pp. 1-5.
RU 1st Office Action with translation; RU Application No. 2014106421/13(010183); dated Jul. 6, 2015, pp. 1-10.
RU 1st Office Action with Translation; RU Patent Application No. 2016130013/13(046711); dated Nov. 21, 2017; pp. 1-9.
RU Decision of Granting with translation, RU Application No. 2014106418/13(010180); dated Jan. 13, 2016, pp. 1-24.
RU Decision of Granting with translation; Application No. 2013145559/13(070430); dated Mar. 26, 2015; pp. 1-15.
RU Decision of Granting with translation; RU Application No. 2014106421/13(010183); dated Jan. 26, 2016, pp. 1-19.
RU Decision of Granting with translation; RU Application No. 2014106422/13(010184); dated Nov. 26, 2015, pp. 1-22.
Russian Office action issued in Russian Patent Application No. 2014106421/13(010183) dated Oct. 20, 2015, 7 pages.
Russian Office Action with Translation; RU Patent Application No. 2014106422/13(010184);dated Aug. 11, 2015; pp. 11.
Supervising Editor Aya Kagawa, "Fourth Standard Tables of Food Composition in Japan," First Edition, Kagawa Education Institute of Nutrition, Published Department, (1994), pp. 72-73.
Supplementary European Search Report for App. No. 08 866 890 dated Jan. 22, 2014.
Supplementary European Search Report for App. No. 08868714 dated Jan. 15, 2014.
Decision of Final Rejection (with Translation); Japanese Application No. 2016-550532; dated Dec. 20, 2018; 10 Pages.
English Translation of JP H06-46760. (Year: 1994), pp. 1-13.
Examination Report under Sections 12 & 13 of the Patents Act, 1970 and the Patent Rules, 2003; Indian Application No. 313/CHENP/2014; dated Dec. 14, 2018; 7 Pages.
Extended European Search Report; European Application No. 18197983.2; dated Feb. 12, 2019; 11 Pages.
Non-Final Office Action; U.S. Appl. No. 15/123,387, filed Sep. 2, 2016; Method for Manufacturing a Comestible; dated Oct. 26, 2018.
Non-Final Office Action; U.S. Appl. No. 14/430,083, filed Mar. 20, 2015; Advanced Gum Forming; dated Oct. 19, 2017; 21 Pages.
Notification of the First Office Action and Search Report; Chinese Application No. 2015/0026070.7; dated Mar. 12, 2018; 17 Pages.
Office Action and Search Report; Chinese Application No. 201480046262.X; dated Nov. 2, 2018; 10 Pages.
U.S. Office Action; U.S. Appl. No. 13/522767; Advisory Action; dated Aug. 11, 2015, pp. 1-3.
U.S. Office Action; U.S. Appl. No. 13/522,767; Final Office Action; dated Jun. 30, 2017, pp. 1-24.
U.S. Office Action; U.S. Appl. No. 13/522,767; Non-Final Office Action; dated Dec. 13, 2016, pp. 1-24.
U.S. Office Action; U.S. Appl. No. 13/522,767; Non-Final Office Action; dated Jun. 3, 2016, pp. 1-20.
U.S. Office Action; U.S. Appl. No. 14/004,343; Non-Final Office Aciton; dated Sep. 6, 2018, pp. 1-16.
U.S. Office Action; U.S. Appl. No. 14/004,343; Advisory Action; dated Apr. 20, 2017; pp. 1-5.
U.S. Office Action; U.S. Appl. No. 14/004,343; Advisory Action; dated Dec. 14, 2015; pp. 1-8.
U.S. Office Action; U.S. Appl. No. 14/004,343; Final Office Action; dated Dec. 30, 2016; pp. 1-13.
U.S. Office Action; U.S. Appl. No. 14/004,343; Non-Final Office Action; dated May 23, 2016; pp. 1-13.
U.S. Office Action; U.S. Appl. No. 14/004,343; Notice of Allowance; dated Jun. 7, 2017; pp. 1-8.
U.S. Office Action; U.S. Appl. No. 14/233,796; Final Office Action; dated Feb. 5, 2018, pp. 1-23.
U.S. Office Action; U.S. Appl. No. 15/108,916; Non-Final Office Action; dated Sep. 19, 2018, pp. 1-17.
Chinese Office Action; International Application No. 201711337861.9; International Filing Date: Dec. 14, 2017; dated Sep. 2, 2020; 17 pages.
European Office Action; International Application No. 17/185358.3-1105; International Filing Date: Aug. 8, 2017; dated Aug. 28, 2020; 4 pages.
Extended European Search Report; International Application No. 20181435.7-1106; International Filing Date: Jun. 22, 2020; dated Oct. 19, 2020; 13 pages.
Chinese Office Action; International Application No. 201580024617.X; International Filing Date: Nov. 10, 2016; dated Jun. 16, 2020; 12 pages.
Chinese Office Action; International Application No. 201710866206.6; International Filing Date: Sep. 22, 2017; dated Apr. 8, 2020; 4 pages.
Japanese Office Action; International Application No. 2019-080968; International Filing Date: Apr. 2, 2016; dated May 8, 2020; 2 pages.
Notification of the 1st CN Office Acton with translation, CN Application No. 201810420045.2; dated Apr. 23, 2021, pp. 1-17.

\* cited by examiner

SYSTEM AND METHOD FOR FORMING AND COOLING CHEWING GUM

CROSS REFERENCE TO RELATED APPLICATIONS

This is a U.S. national stage of application no. PCT/US2012/047411, filed on Jul. 19, 2012, which claims priority to 61/510,123, filed Jul. 21, 2011, the disclosures of which is incorporated herein by reference.

FIELD

The disclosure relates generally to a gum processing system and method, and more particularly to a system and method for forming and cooling gum.

BACKGROUND

In conventional gum processing lines, gum that is formed and sized into desirable dimensions (slab, sheet, pellets, etc.) must be cooled and then conditioned for up to 48 hours before the folded slabs, sheets, or pellets can be stacked on top of each other or collected together without sticking. Furthermore, a powder or particulate material is typically added to the gum at some point during the processing, so as to further prevent the gum from sticking to various components of the gum processing line, as well as sticking to other gum pieces during stacking.

Gum conditioning that lasts for extended periods of time can cause an undesirable interruption in the processing and eventual packaging of gum pieces. In addition, application of powder (and the removal thereof) can increase energy consumption of the overall system, and have an undesirable effect on the final product if the powder is not effectively removed.

Accordingly, a system for forming and cooling gum in a manner that reduces conditioning time and powder usage would be desirable.

SUMMARY

Disclosed is a system for forming and cooling gum, the system including a forming system configured to size the gum to include a substantially uniform thickness between about 0.3 mm to 10 mm, a cooling device that is disposed in-line with the forming system and configured to continuously receive the gum from the forming system at an entry point of the cooling device, and a multi-pass conveying system configured to continuously transport the gum from the entry point to an exit point of the cooling device, the forming system and the cooling device being configured to form and cool the gum to be in a condition for stacking or collecting upon exiting the exit point of the cooling device.

Also disclosed is a method for forming and cooling gum, the method including forming the gum to include desirable dimensions; continuously transporting the gum to an entry point of a cooling device, and continuously transporting the gum from the entry point to an exit point of the cooling device via a multi-pass conveying apparatus; wherein the gum exits the cooling device in a condition for stacking or collecting.

Additionally disclosed is a system for forming and cooling gum, the system including a forming system configured to size the gum to include desirable dimensions, and a set of cooling rollers disposed in-line with the forming system and configured to continuously receive the gum from the forming system, the forming system and the set of cooling rollers being configured to form and cool the gum to be in a condition for stacking or collecting upon exiting the exit point of the cooling device.

Further disclosed is a system for forming and cooling gum, the system including a forming system configured to size the gum to include a substantially uniform thickness between about 0.3 mm to 10 mm, a cooling unit including multiple cooling devices, the cooling unit being disposed in-line with the forming system and configured to continuously receive the gum from the forming system at an entry point of the cooling unit, and a multi-pass conveying system configured to continuously transport the gum from the entry point to an exit point of the cooling unit, the forming system and the cooling unit being configured to form and cool the gum to be in a condition for stacking or collecting upon exiting the exit point of the cooling unit.

Still further disclosed is a system for cooling gum including a cooling device including an entry point and an exit point, and a multi-pass conveying system configured to continuously transport the gum from the entry point to the exit point of the cooling device, the multi-pass conveying system being configured to simultaneously impart conductive cooling to the gum at vertically opposing surfaces of the gum.

Additionally disclosed is a method for processing gum, the method including mixing the gum via a mixing device, continuously transporting the gum from the mixing device to a forming system; forming the gum to include desirable dimensions via the forming system, continuously transporting the gum from the forming system to an entry point of a cooling unit including at least one cooling device, continuously transporting the gum from the entry point to an exit point of the cooling unit via a multi-pass conveying apparatus, wherein the gum exits the cooling unit in a condition for stacking or collecting, continuously transporting the gum from the cooling unit to a packaging system, and packaging the gum.

BRIEF DESCRIPTION OF THE FIGURES

The accompanying drawings incorporated in and forming a part of the specification embodies several aspects of the present invention and, together with the description, serve to explain the principles of the invention. In the drawings.

DETAILED DESCRIPTION

Before turning in greater detail to the systems and methods discussed below, some general compositional information about gum will be provided. Chewing gum comprises in large part of components that are usually never swallowed, gum base, which is the rubber-like chewing component. Chewing gum also comprises a consumed portion including sweeteners, flavors and the like, and may also include other candy or food product integrated therewith in layers or as ingredients. The gum base is relatively unique in food processing in that it introduces the material with a resiliency and elasticity relative to processing and also provides a relatively non-conductive or insulating material that does not transfer heat very well. This provides unique processing difficulties. Relative to processing, the temperature of the processed gum product greatly affects viscosity as well as other processing characteristics such as elasticity and resiliency.

Further, different types of gum recipes will also alter processing considerations, and there generally is a desire to run different gum recipes on the same equipment or lines. Some of the ingredients handle processing quite well. Other ingredients such as flavors may be subject to flash off due to heat, thereby diminishing the amount of flavor in the final consumable product. Other ingredients such as encapsulated sweeteners, are sensitive to shear forces (e.g. due to substantial pressure, intense mixing, processing force and the like) and thus can be damaged during processing. These factors all provide different challenges relative to sizing the gum to a small bit size portion and conditioning of the gum for packaging in gum packaging. For purpose of understanding, some lexicography and typical gum composition components will be discussed below.

As used herein, any recited gum may include, but not be limited to, compositions ranging from and inclusive of compounded elastomer to finished gum, which may include compounded elastomer in addition to some compounding aids, master batch gum base, compounded elastomer in addition to some subsequent gum ingredients, compounded elastomer in addition to some gum base ingredients and some subsequent gum ingredients, gum base, gum base in addition to some subsequent gum ingredients, master batch finished gum, and finished gum.

In addition to the various chewing gums mentioned above, it should be appreciated that the below discussed systems and methods may be used to form and size confectionary or candy, combinations of gum ingredients with confectionary or candy ingredients, and combinations of gum with confectionary or candy, as disclosed in U.S. Patent Publication No. 2008/0166449, International Publication No. WO 2011/044373, and International Publication No. WO 2010/092480 the teachings and disclosures of which are hereby incorporated by reference in their entireties to the extent not inconsistent with the present disclosure.

Figure 1:
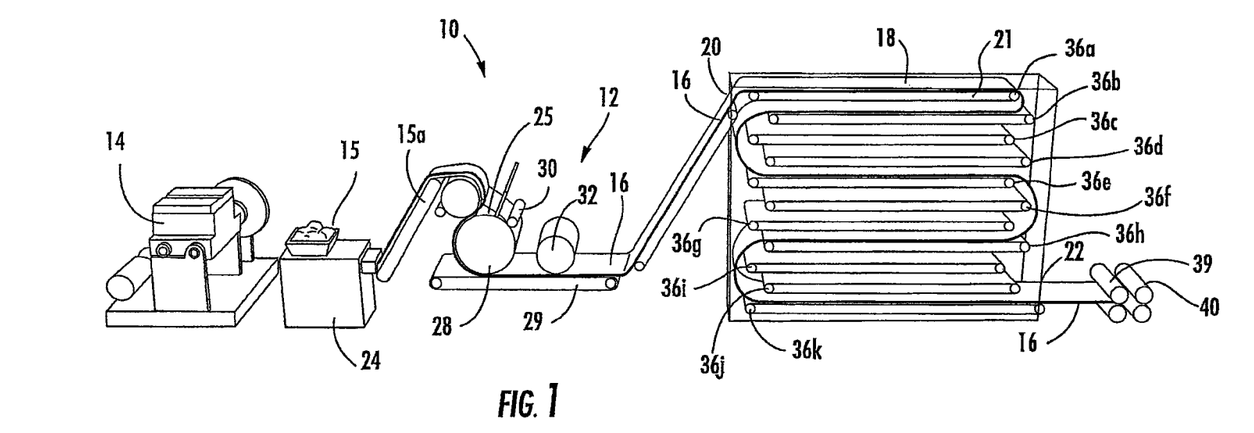
FIG. 1 is a schematic and perspective illustration of a system for forming and cooling gum according to a first exemplary embodiment.

Referring now to FIG. 1, a system 10 for forming and cooling gum is illustrated. The system includes a forming apparatus or system portion 12 that forms/sizes a gum mass 15 (which is mixed to include desirable ingredients in a gum mixer 14) into a gum slab 16 including a desirable thickness, such as a substantially uniform thickness between about. 1 mm to 60 mm, and more particularly 0.3 mm to 10 mm over the whole slab 16 or at least a portion of the slab 16, and a desirable width, such as a substantially uniform width that is greater than 50 cm over the whole slab 16 or at least a portion of the slab 16, between 5 mm and 2000 mm over the whole slab 16 or at least a portion of the slab 16, or between 225 mm and 450 mm over the whole slab 16 or at least a portion of the slab 16. The system 10 also includes a cooling device 18 (such as cooling housing 18 shown in the Figures without a front wall) that is disposed in-line with the forming apparatus 12 and configured to continuously receive the gum slab 16 from the forming apparatus 12 at an entry point 20 of the cooling housing 18. The cooling housing 18 includes a multi-pass conveying apparatus or system portion 21 that continuously transports the gum slab 16 from the entry point 20 to an exit point 22, thereby cooling the gum slab 16 to a point of being in condition for stacking (without sticking) upon exiting the cooling housing 18. These various components of the system 10, and the manner in which they operate to form and cool the gum, will be discussed in greater detail hereinbelow.

As shown in FIG. 1, the gum mass 15 is prepared for forming and cooling within the system 10 via gum mixer 14. The gum mixer 14 mixes the gum to include desirable ingredients and a desirable consistency. The resulting gum mass 15 is then transported to the forming apparatus 12 of the gum system 10. The gum mixer 14 may be disposed in line with the gum system 10, such that the gum system 10 continuously receives the gum mass 15 from the mixer 14 via a device such as a conveyor belt.

In the exemplary embodiment of FIG. 1, the gum mass 15 is transported from the mixer 14 to a pre-extruding device 24, which extrudes the mass as a gum slab 15a. However, it should be appreciated that this pre-extruder 24 may be removed from the system 10, and the gum mass 15 may simply be transported directly to collection area 25 (which may include a collection device such as the hopper 27 shown in FIG. 2) disposed immediately upstream of a gap between rollers 26 and 28. The pre-extruded slab 15a may also collect at the collection area 25 disposed immediately upstream of a gap between rollers 26 and 28, as shown in FIG. 1.

As the gum mass 15 or collected slab 15a passes through the gap between the rollers 26 and 28, it is deformed to include a desirable thickness, such as a substantially uniform thickness (over at least a portion thereof) between about 0.3 mm to 10 mm. In the exemplary embodiment of FIG. 1, oil is applied to the lower roller 28, and therefore the gum, via oil applicator 30. However, it should be appreciated that oil may also be applied via applicator to the upper roller 26, and/or directly to the gum slab 16, slab 15a, or mass 15. In addition, it should be noted that the forming apparatus 12 may include multiple sets of rollers 26 and 28 (three sets in an exemplary embodiment) that each receive a gum mass 15 or pre-extruded slab 15a and deform the gum mass or pre-extruded slab into multiple slabs 16 of a desirable thickness (three slabs in an exemplary embodiment) that are stacked one on top of the other to form a multi-layer slab of gum to be transported to downstream areas of the system 10.

Upon being pulled through and exiting the gap between the counter rotating rollers 26 and 28 (the counter rotation of the roller pulling the gum through the gap), the gum slab 16 is transported along a relative back of the lower roller 28 down to a conveyor 29. In the exemplary embodiment of FIG. 1, the conveyor 29 transports the gum slab 16 to an optional smoothing roller 32, which smoothes and removes irregularities from an upper surface of the slab 16. The now desirably sized slab 16 (desirably sized with regards to at least width and thickness) is then ready for continuous transport to the cooling housing 18.

As is shown in FIG. 1, the cooling housing 18 is positioned in line with the forming apparatus 12 so as to continuously receive the gum slab 16 from the forming apparatus 12 via a conveyor belt 34. In the exemplary embodiment of FIG. 1, the gum slab 16 is continually transported via conveyor 34 to the entry point 20, which is an opening to the housing disposed at a relatively upper portion thereof. This conveyor 34 transports the slab 16 to the multi-pass conveying system 21 disposed within the cooling housing 18, and does so continuously in that the slab is transported from the forming apparatus 12 to the cooling housing 18 without having to place the gum in holding area (such as an area for conditioning). In general, continuous transporting or receiving may be defined as transporting or receiving with necessitating placement in a holding area.

As shown in the exemplary embodiment of FIG. 1, the area of the conveyor 34, which is between the forming apparatus 12 (ending at the forming roller 32) and the cooling housing 18, may be absent any gum processing equipment beyond merely transporting equipment such as the conveyor 34. However, this area of the conveyor 34 may optionally include processing equipment such as but not limited to gum drying equipment, a particulate adding equipment, printing equipment, spraying equipment, and rollers configured to at least one form, smooth, cut, and score.

Turning now to the multi-pass conveying system 21 disposed in the housing 18, the exemplary embodiment of FIG. 1 shows a system 21 that includes a series of vertically displaced conveyor belts 36a-k. The vertically displaced belts 36a-k allow for the multiple passes of the multi-pass conveying system 21. While the conveying system 21 of this embodiment shows eleven belts 36a-k, it should be appreciated that any number of belts may be used to impart a desirable amount of cooling to the gum slab 16. In addition, though the exemplary embodiment of FIG. 1 shows the entry point 20 to be at a level of belt 36a and the exit point 22 to be at a level of belt 36k, it should be appreciated that the housing 18 may include entry and exit openings (that are closable via doors) at levels of each belt 36a-k.

As the gum slab 16 enters the housing 18 it is disposed upon conveyor belt 36a. Belt 36a transports the gum slab 16 from the entry point 20 to an end of belt 36a disposed opposite of the entry point 20. Upon reaching the end of the belt 36a, the gum slab 16 falls to a lower belt moving in an opposing direction to belt 36a. In FIG. 1, this belt is 36b. However, it should be appreciated that the gum slab may fall to any lower belt moving in an opposing direction. For example, when the gum slab 16 reaches an end of belt 36b, it falls to directionally opposite belt 36e, thereby by-passing belts 36c-d. This by-passing of belts (which is also shown with regards to belts 36e-h and belts 36h-k) can be beneficial to the system in that allows the gum slab 16 to have a larger turn radius that is less likely to damage the integrity of the gum slab 16. The by-passing of various belts may be assisted by guide shields disposed between vertically adjacent belts (such as belt 36b and belt 36c). In addition, transportation of the gum slab 16 between vertically adjacent belts (such as belt 36a and 36b) is assisted via the horizontal staggering or offset of each vertically adjacent belt as shown in FIG. 1.

Regardless of whether each belt in the multi-pass system 21 is used, or whether certain belts are by-passed to increase turn radius and maintain slab integrity, the gum slab 16 will include enough passes (i.e. be transported by enough belts) along the multi-pass system 21 and residence time within the cooling housing 18 to cool the slab to a desirable temperature. In the exemplary embodiment of FIG. 1, this cooling is imparted to the slab via convective and conductive cooling, and cools the gum slab 16 from a temperature at or above 40° C. upon entry at the entry point 20 to a temperature at or below 25° C. upon exit at the exit point 22. In a further exemplary embodiment, the gum slab is cooled to 0-20° C., more specifically 10° C.-20° C., and even more specifically 15° C. at the exit point 22. It is notable that, in an exemplary embodiment of the system 10, temperature change decreases with each subsequent pass through the housing 18. That is, temperature change in the first pass will be greater than temperature change in the second pass, and even greater than temperature change in the last pass (should the housing 18 include more than two passes). Further, an exemplary embodiment of the system 10 employs a residence time of approximately 6 minutes in order to cool the gum slab 16 (particularly a gum slab including a thickness of about 5.5 mm) to a temperature at or below 25° C.

Figure 1A:
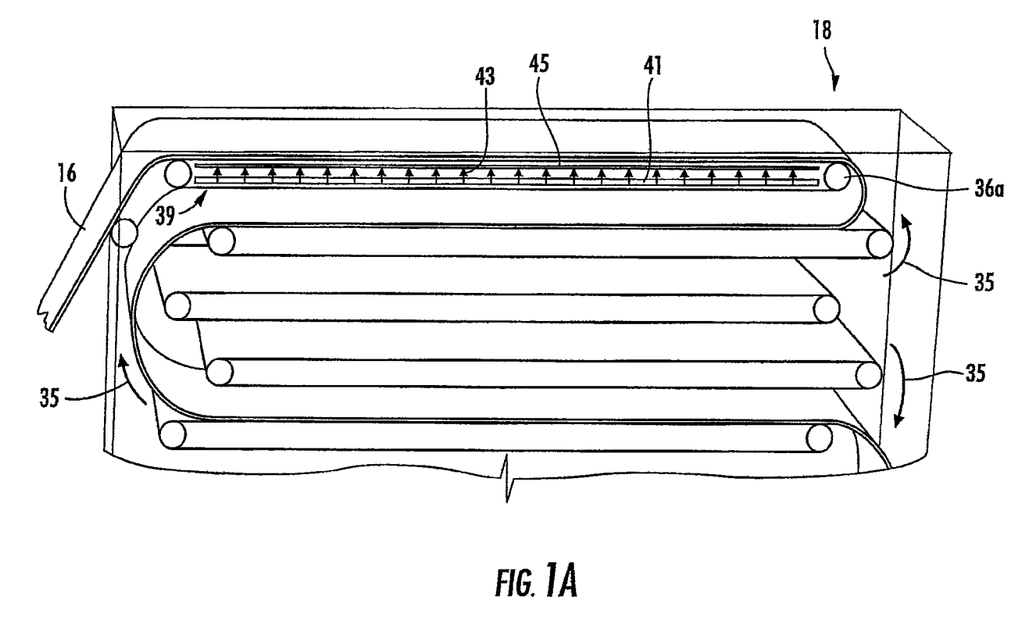
FIG. 1A is a partial schematic and perspective illustration of the system of FIG. 1.

Turning now to a manner by which the cooling housing 18 and multi-pass system 21 cool the gum slab 16, it should be noted that the slab 16 includes two surfaces available for cooling (i.e. the upper and lower surfaces of the slab 16 relative to the belt carrying the slab). As such, a housing and multi-pass system able to cool the slab 16 at these two surfaces would be desirable and efficient relative to a system that could only cool at one of the surfaces. Referring to FIG. 1A, exemplary embodiments of the housing 18 and multi-pass system 21, as capable of cooling the slab 16 at both surfaces of the slab, are illustrated.

As shown in FIG. 1A, convective currents 35 circulating within the housing and around/between the belts 36a-k may cool the upper or exposed surfaces 33 of the slab 16 via convection. In an exemplary embodiment, these currents 35 are cross flow currents that run horizontally perpendicular to gum flow (despite the more vertical direction of the arrows demonstrating current flow 35 as shown in FIG. 1A). The currents 35 (along with any cooling created by the cooled belts) may create an internal housing air temperature of 5° to 10° C. These convective currents 35 may be achieved via any known means for forcing air within a cooling housing, such as but not limited to cross flow forced convection achieved via slot fans or other fans, which has the effect of removing heat from the gum slab 16.

In addition to the convective cooling via currents 35, the lower surfaces 37 of the slab 16 (i.e. the surfaces that will contact the belts) may also be cooled via conductive cooling imparted from the cooled belts 36a-k. In the exemplary embodiment of FIG. 1A, the belts 36a-k may be cooled in any desirable manner, such as but not limited to a fluid circulation system 39 as shown by way of example in belt 36a (shown in cross-section). In this exemplary embodiment, the system 39 includes a fluid channel 41 with fluid nozzles 43 configured to spray a chilled fluid onto a thermally conductive support 45 (just beneath a relative upper surface of the belt 36a). The cooled support 45 (which may be stainless steel) imparts a conductive cooling to the belt 36a, which thereby imparts conductive cooling to the slab 16.

Figure 1B:
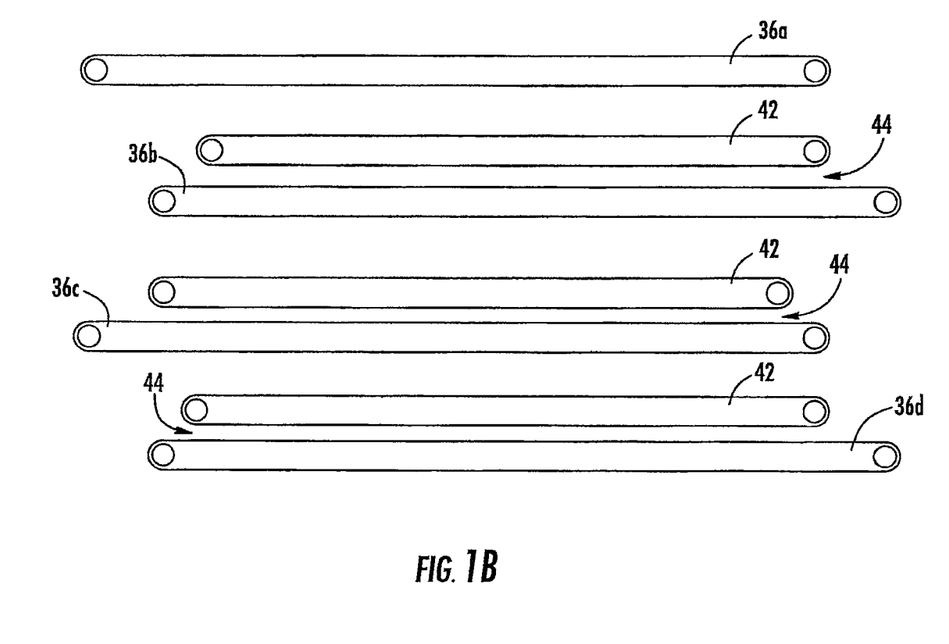
FIG. 1B is a partial schematic and perspective illustration of the system of a system for forming and cooling gum according to a first exemplary embodiment.

Of course, it should also be appreciated that the slab 16 may be cooled at one surface (via either of the convective or conductive cooling discussed above), with the slab 16 requiring more residence time within the housing (via slower belts, more passes/belts, etc.) to compensate for the less efficient cooling. In addition, and as shown in FIG. 1B, the multi-pass system 21 may include upper belts 42 configured to contact the upper surface 33 of the slab 16 at the same time the lower belts (i.e. 36a-d in this example) contact the lower surface 37 of the slab 16. The upper belts 42 are adjustably spaced from the lower belts 36a-d so as to create a gap 44 that is substantially equal to a thickness of the slab flowing therebetween. Like the cooled belt discussed above, each of the belts 40 and 36a-k (36a-d in the example shown in FIG. 1B) may be cooled via a fluid circulation system 39. However, the belts 40 will include systems 39 that are vertically reversed relative to that which is shown in belt 36a of FIG. 1B. That is, the fluid channel 41 is disposed in a relatively upper portion of the belts 40, and the conductive support 45 is disposed in a relatively lower portion, so as to impart conductive cooling to the upper surface 33 of the slab 16. The belts 40 and 36a-k rotate in opposite directions, thereby pulling the slab through the gap 44. This pulling of the slab through the gap 44 will cause little to no deformation or compression of the slab 16.

Turning back now to FIG. 1, upon reaching the exit point 22 the gum slab 16 has been cooled via the above discussed cooling to a point where it is in condition for stacking. This means that the slab 16 has been cooled to a point where it may be folded and stacked (one fold in direct contact with another) without sticking to each other. In addition, the slab 16 may be scored and cut into desirably sized and shaped sheets (the scoring being in a longitudinal direction of movement on the belts), and these sheets may be stacked in direct contact with each other without sticking to each other. Such scoring and cutting may occur via scoring rollers 38 and cutting rollers 40 disposed in proximity to the exit point 22. These scoring and cutting rollers 38 and 40 may be optionally cooled (via any desirable means for cooling rollers) so as to help maintain the cut pieces of the exiting slab 16 at a desirably cooled temperature.

After being scored and cut into stackable sheets, the pieces may then be transported to further processing and packaging systems. These systems (not shown in the Figures) may be disposed in line with the cooling housing 18 (and thus the rest of the gum system 10), such that the packaging system will eventually and continuously receive the gum from the cooling tunnel 18 via a device such as a conveyor belt. In this manner, the system 10 may allow for in line, continuous processing of the gum from mixing to packaging.

Figure 2:
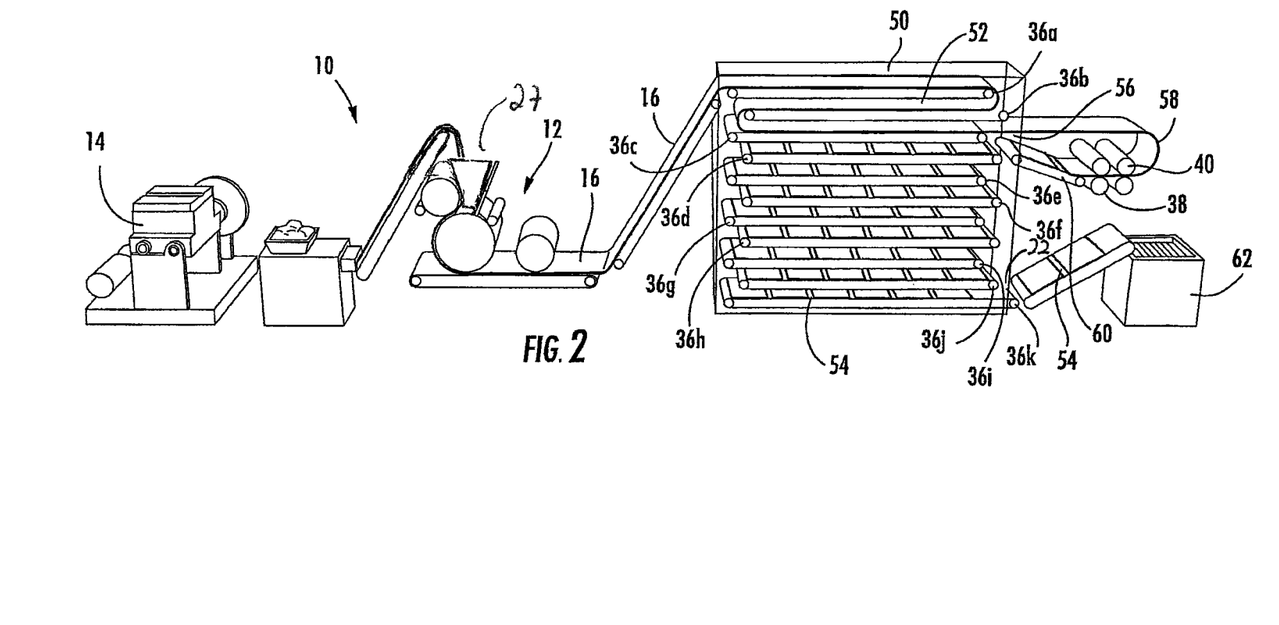
FIG. 2 is a schematic and perspective illustration of a system for forming and cooling gum according to another exemplary embodiment.
Figure 3:
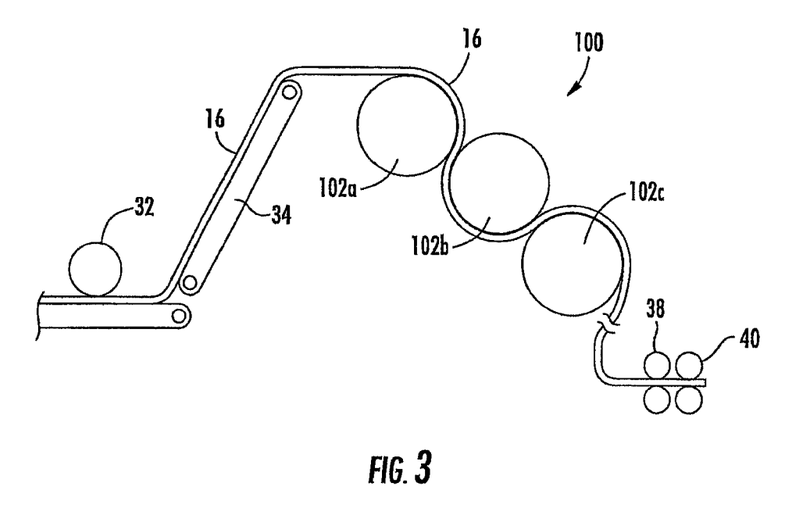
FIG. 3 is a partial schematic illustration of a system for forming and cooling gum according to yet another exemplary embodiment.
Figure 4:
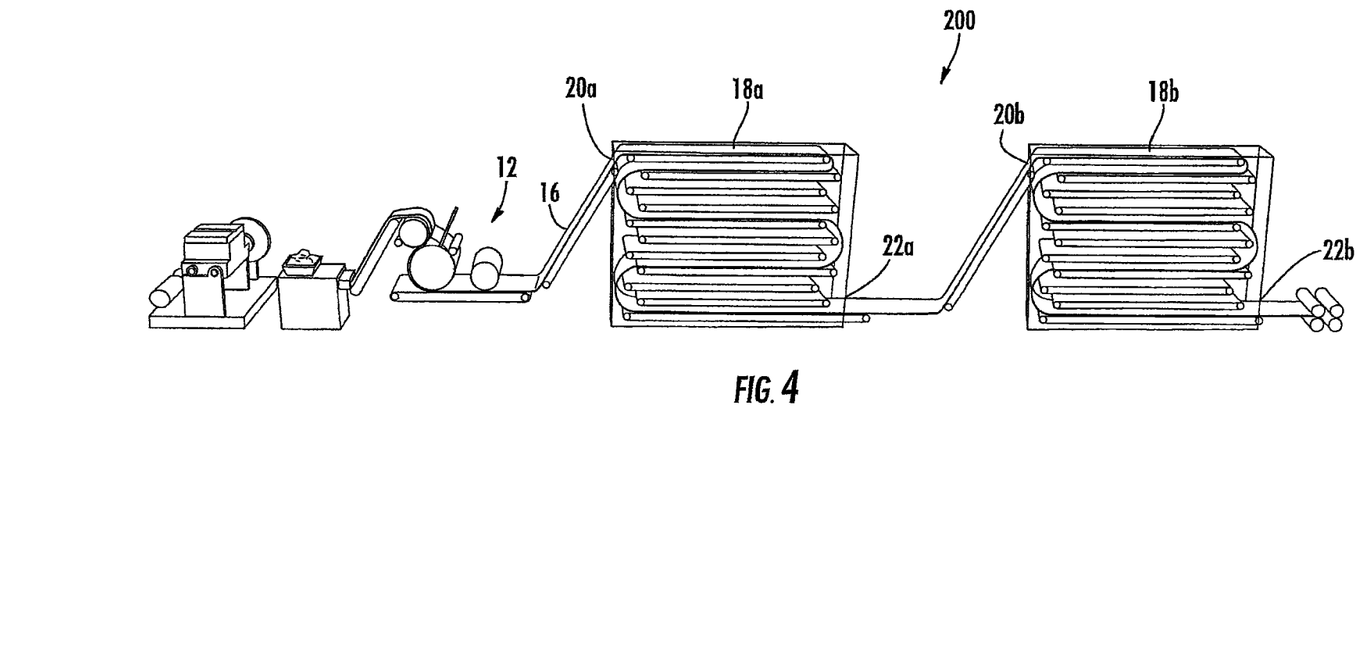
FIG. 4 is a schematic and perspective illustration of a system for forming and cooling gum according to still another exemplary embodiment.

Referring now to the exemplary embodiment of FIG. 2, cooling of the gum may also occur via cooling housing 50 and multi-pass conveying system 52 as shown. It should be appreciated that the description and discussion above for the forming apparatus 12 and overall system 10 (including the conductive and convective cooling in the cooling housing) are also applicable in the below described embodiments as shown in FIGS. 2-4.

As shown in FIG. 2, the gum slab 16 is scored and cut into desirably shaped and sized gum sheets 54 via scoring rollers 38 and cutting rollers 40 disposed along or midstream of a flow path of the multi-pass conveying system 52 (as opposed to downstream of the exit point 22 thereof as shown in FIG. 1). Similarly to FIG. 1, in this exemplary embodiment of FIG. 2 the gum slab 16 enters the cooling housing at entry point 20, and is disposed on conveyor belt 36a. Belt 36a then transports the gum slab 16 from the entry point 20 to an end of belt 36a disposed opposite of the entry point 20. Upon reaching the end of the belt 36a, the gum slab 16 falls to belt 36b, which is moving in an opposite direction of belt 36a. The gum slab 16 is then transported in an opposite end of belt 36b, and falls to belt 36c, which is moving in an opposite direction of belt 36b. It is at belt 36c where a substantial difference between the exemplary embodiments of FIGS. 1 and 2 is shown.

As shown in FIG. 2, belt 36c transports the gum slab to a mid-stream opening 56 in the housing 50. Though this opening 56 is shown in FIG. 3 to be disposed at level of belts 36c and 36d, it should be appreciated that the opening 56 may be disposed at either side of the housing 18 and at any desirable level of any of the belts 36a-k via the openings and doors discussed with reference to FIG. 1 above. These mid-stream openings, such as opening 56 allow the flow path of the multi-pass conveying system 52 to extend to a scoring and cutting area 58 disposed outside of the housing 50. In the exemplary embodiment of FIG. 2, the gum slab 16 travels away from the housing on a downwardly angled conveyor belt (not shown) to a horizontal conveyor belt (not shown) extending below and beyond an extent of the angled belt, in plane with a gap between the scoring and cutting rollers 38, 40. This horizontal belt, which runs back towards the housing 18, then transports that slab 16 to the scoring and cutting rollers 38, 40, which pull the slab 16 through the gap therebetween. The scoring and cutting rollers 38, 40 score and cut the slab 16 into gum sheets 54, and deposit the gum sheets 54 onto return belt 60. The return belt 60 is illustrated on an upward angle, so as to compensate for the downwardly vertical distance the slab 16 traveled on the downwardly angled belt (which may travel down to almost floor level in order to reach the horizontal belt). In this embodiment, the return belt 60 then returns the scored gum sheets 54 to the multi-pass conveying system 52 and cooling housing 50 by transporting the gum sheets 54 to belt 36d.

In another embodiment however, the belt 36c may extend from the mid-stream opening 56 to a point above the scoring and cutting rollers 38, 40. In such an embodiment, the slab 16 may turn downwards towards the rollers 38, 40 around the belt 36c in a manner similar to the slab turn shown at belt 36a. In this manner, the extended belt 36c would support the gum slab 16 while in a pre-turn portion of the scoring and cutting area 58.

It yet another embodiment, the scoring and cutting may occur at an end of extended belt 36c or separate belt outside of the housing 18 supporting the slab 16 (i.e. in a relatively upper portion of the scoring and cutting area 58). The scored and cut gum sheets 54 in such an embodiment may then drop to an extended belt 36d or return belt 60 that may be inclined on a plane more parallel to belts 36c and 36d, and extend beyond an extent of belt 36c. However, regardless of the equipment configurations by which the slab 16 is scored and cut into gum sheets 54, it is important to note that the scoring and cutting simply takes place within the flow path of the multi-pass conveying system 52.

It should be appreciated that the scoring in the above discussed embodiments results in pellet shaped scores in the gum sheet 54. This scoring should occur at or above a temperature of 35° C.

Once the gum sheets 54 are back within the housing 18 on belt 36d, they are transported to an opposite end thereof, and fall to belt 36e, which runs in a direction opposite of belt 36d. In this manner, the gum sheets 54 may then cascade down the reaming belts 36f-36k of the conveying system 52, assisted, as discussed above, by the horizontal staggering or offset of the belts. Guide shields may also be used to ensure that the gum sheets 54 fall from a belt to the belt vertically adjacent (i.e. immediately below) thereto. Similarly to the discussions of FIG. 1, the gum sheets 54 are cooled during their multi-pass residence time via convective and conductive cooling from a temperature at or above 40° C. upon entry at the entry point 20 to a temperature at or below 25° C. upon exit at the exit point 22. In a further exemplary embodiment, the gum sheets 54 cooled to 10-20° C., and more specifically 15° C. at the exit point 22. The gum sheets 54 are thereby cooled to a point where they are in condition for stacking.

It should be noted however, that as the gum sheets 54 cool within the housing 18, the sheets may break into pellets along the pellet shaped scores created by the scoring roller 38. The cooling of the gum sheets 54 along with falls from one belt to another in the housing 18 will facilitate this breaking if it is to occur. In this manner, either the gum sheets 54 or the pellets that the sheets break into will be collected in condition for stacking (i.e. not sticking) in bin 62 (where gum sheets 54 may also break into pellets). However, due to full or partial sheet breakage into pellets, the accumulation of gum in the bin 62 will be more irregular collecting than that which might be considered "stacking." In any event, the collected or stacked gum will have been cooled to a point that the sheets or pellets will not stick to each other after leaving the cooling housing 18.

Referring now to FIG. 3, it should be appreciated that the cooling housing 18 and conveying system 21 of FIG. 1 may be replaced with a cooling roller system 100 including a series of cooling rollers 102a-c configured to continuously receive the gum slab 16 from the forming apparatus 12. This system 100 may include any number of rollers necessary to cool the gum slab 16 from a temperature at or above 40° C. upon contact with the first roller 102a to a temperature at or below 25° C. (more specifically 0-20° C., 10-20° C., or 15° C.) upon release from the last roller in the series (roller 102c in FIG. 3). In an exemplary embodiment, such cooling of the gum surface may also be enhanced via addition of cooled air impinging against the outer gum surface, with the cooled air being supplied by slot fans or other kinds of fans. Via a system including these rollers 102a-c (such as system 100), the slab 16 may be cooled to a point where it is in condition for stacking.

Referring to FIG. 4, cooling of the gum slab or pellets to a point where the slab or pellets are in a condition for stacking may also take place in a cooling unit 200. As shown in FIG. 4, the cooling unit 200 includes two or more cooling housings 18a and 18b (each housing being substantially the same in structure and cooling methods and capabilities as that shown in FIG. 1) disposed in line with each other such that the gum slab flows continuously therebetween. Housing 18a continuously receives the gum slab 16 from the forming apparatus 12, and the slab 16 is continuously transported to exit point 22b of housing 18b. The unit 200 cools the gum slab 16 from a temperature at or above 40° C. upon entry at the entry point 20a to a temperature at or below 25° C. upon exit at the exit point 22b. In a further exemplary embodiment, the gum slab is cooled to 10-20° C., and more specifically 15° C. at the exit point 22b. It should be appreciated that scoring and cutting rollers 38 and 40 may also be disposed between the housings 18a and 18b, with slab being transported through housing 18a and pellets being transported through housing 18b. In addition housings 18a or 18b may be replaced with housing 50 of FIG. 2, a more conventional housing including a single pass, different airflow mechanisms, and/or different temperature ranges as desired.

As shown in the exemplary embodiment of FIG. 4, the area of the conveyor between the housings 18a and 18b may also be absent any gum processing equipment beyond merely transporting equipment such as the conveyor as shown. However, this area of the conveyor may optionally include processing equipment such as but not limited to gum drying equipment, a particulate adding equipment, printing equipment, spraying equipment, and rollers configured to at least one form, smooth, cut, and score.

It should be noted that a relatively limited change in average gum thickness is caused by exemplary embodiments of the above discussed cooling housings and the above discussed cooling roller system. In fact, exemplary embodiments of the above housings and above roller system will create a thickness variation in the gum slab 16 of less than 1% between entry and exit of the housings and system. In the system 10 of FIG. 1, such an exit is located at exit 22, while the exit in the system 10 of FIG. 2 may be opening 56 or exit 22, the exit in the system 200 of FIG. 4 may be exit 22a or 22b, and the exit in FIG. 3 is the area immediately downstream of the last roller 102c.

It should be noted that though the above discussed forming apparatus 12 was described with reference to the exemplary embodiment shown in FIGS. 1 and 2, the forming/sizing rollers 26 and 28 may be replaced with any form of moving walls (such as but not limited to a roller and a conveyor belt) configured to size the gum mass 15 into a slab 16 including a desirable thickness, such as a substantially uniform thickness between about 0.3 mm to 10 mm. In addition, the forming apparatus 12 of FIGS. 1 and 2 may be replaced with extruder(s) and sizing rollers from a traditional rolling and scoring system. The forming system 12 may also include multiple forming apparatuses disposed in a series, such as that disclosed in U.S. Application No. 61/451,805, the teachings and disclosures of which being hereby incorporated by reference in their entireties to the extent not inconsistent with the present disclosure.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for forming and cooling gum, the method comprising:
    forming the gum to include desirable dimensions via a forming system;

continuously transporting the gum from said forming system to an entry point of a cooling device;

continuously transporting the gum from said entry point to an exit point of said cooling device via a multi-pass conveying apparatus;

scoring one or more score lines into the gum as the gum is continuously transported between said entry point and said exit point of said cooling device;

vertically transferring the gum including the one or more score lines between passes of said multi-pass conveying apparatus, wherein said multi-pass conveying apparatus includes a plurality of vertically stacked belts having at least a first belt and a second belt moving in opposite directions, said vertically transferring the gum includes turning the gum from said first belt to said second belt, said turning including bending the gum with assistance from with a guide shield arranged at an end of said first belt and said second belt; and breaking the gum along said one or more score lines as the gum is continuously transported between said entry point and said exit point of said cooling device, wherein said breaking occurs at least partially in response to said vertically transferring the gum between passes of said multi-pass conveying device, said breaking and said vertical transfer of the gum between passes being assisted by gravity.

2. The method of claim 1, wherein at said exit point of said cooling device, the gum is in said condition for stacking or collecting.

3. The method of claim 1, wherein at said exit point of said cooling device, the gum has been formed into desirably sized slabs, sheets, pieces, or pellets.

4. The method of claim 1, wherein the gum is provided for said forming as a gum mass, said forming including sizing the gum mass into a desirably sized slab upstream of the cooling device.

5. The method of claim 4, wherein said scoring one or more score lines into the gum comprises forming pellet shaped scores in the gum.

6. The method of claim 1, wherein said flow path of said multi-pass conveying system exits and re-enters said cooling device at a scoring area of said flow path, said scoring occurring at said scoring area.

7. The method of claim 1, wherein said cooling device includes a first housing and a second housing, said entry point being arranged at said first housing and said exit point being located at said second housing.

8. The method of claim 7, wherein said scoring one or more score lines into the gum occurs at a location between said first housing and said second housing.

9. The method of claim 7, wherein breaking the gum along said score lines occurs within said second housing.

10. The method of claim 7, wherein said multi-pass conveying system includes multiple vertically displaced conveyor belt portions within said second housing.

11. The method of claim 1, further including cooling the gum from a temperature at or above 40° C. to a temperature at or below 25° C. via the cooling device and said multi-pass conveying system.

12. The method of claim 1, further including imparting convective and conductive cooling to the gum via said cooling device and said multi-pass conveying system.

13. A method for forming and cooling gum, the method comprising:

forming the gum to include desirable dimensions via a forming system;

continuously transporting the gum from said forming system to an entry point of a cooling unit;

continuously transporting the gum from said entry point to an exit point of said cooling unit via a conveying device;

cutting the gum into a plurality of pellets as the gum is continuously transported between said entry point and said exit point of said cooling unit;

vertically transferring the gum between passes of said conveying device, wherein said conveying device includes a plurality of vertically stacked belts having at least a first belt and a second belt moving in opposite directions, and said vertically transferring the gum includes turning the gum from said first belt to said second belt, said turning including bending the gum with assistance from with a guide shield arranged at an end of said first belt and said second belt; and breaking the gum into said plurality of pellets as the gum is continuously transported between said entry point and said exit point of said cooling unit, wherein said breaking occurs in at least partially in response to said vertically transferring the gum between passes of said conveying device, said breaking and said vertical transfer of the gum between passes being assisted by gravity.

14. The method of claim 13, wherein said cooling unit includes at least a first cooling housing and a second cooling housing, said entry point being arranged at said first housing and said exit point being located at said second housing.

15. The method of claim 14, wherein said cutting the gum into a plurality of pellets occurs at a location between said first housing and said second housing.

16. The method of claim 14, wherein breaking the gum into said plurality of pellets occurs within said second housing.

17. The method of claim 14, wherein said conveying device includes a multi-pass conveying system arranged within said second housing.

18. The method of claim 17, wherein said multi-pass conveying system includes multiple vertically displaced conveyor belt portions within said second housing.

19. The method of claim 14, wherein said conveying device includes a single-pass conveying system arranged within said first housing.

20. The method of claim 13, further including cooling the gum from a temperature at or above 40° C. to a temperature at or below 25° C. via the cooling device and said multi-pass conveying system.

21. The method of claim 13, further including imparting convective and conductive cooling to the gum via said cooling device and said multi-pass conveying system.

22. The method of claim 13, wherein the gum is provided for said forming as a gum mass, said forming including sizing the gum mass into a desirably sized slab upstream of the cooling unit.

23. The method of claim 13, wherein said first belt is arranged directly vertically adjacent said second belt.

24. The method of claim 13, wherein said first belt is horizontally offset from said second belt.

25. The method of claim 13, wherein said plurality of belts includes at least a third belt, said third belt being positioned vertically between said first belt and said second belt.

* * * * *